(12) United States Patent
Ma et al.

(10) Patent No.: US 11,022,524 B2
(45) Date of Patent: Jun. 1, 2021

(54) STOCHASTIC CONFIGURATION NETWORK BASED TURBOFAN ENGINE HEALTH PARAMETER ESTIMATION METHOD

(71) Applicant: DALIAN UNIVERSITY OF TECHNOLOGY, Liaoning (CN)

(72) Inventors: Yanhua Ma, Liaoning (CN); Xian Du, Liaoning (CN); Ximing Sun, Liaoning (CN); Yuhu Wu, Liaoning (CN); Yanlei Gao, Liaoning (CN)

(73) Assignee: DALIAN UNIVERSITY OF TECHNOLOGY, Liaoning (CN)

( * ) Notice: Subject to any disclaimer, the term of this patent is extended or adjusted under 35 U.S.C. 154(b) by 0 days.

(21) Appl. No.: 16/967,313

(22) PCT Filed: Nov. 28, 2019

(86) PCT No.: PCT/CN2019/121400
§ 371 (c)(1),
(2) Date: Aug. 4, 2020

(65) Prior Publication Data
US 2021/0131914 A1    May 6, 2021

(51) Int. Cl.
*G01M 15/05*    (2006.01)
*G06N 3/04*    (2006.01)
(Continued)

(52) U.S. Cl.
CPC ........... *G01M 15/05* (2013.01); *B64F 5/60* (2017.01); *G05B 23/0283* (2013.01);
(Continued)

(58) Field of Classification Search
CPC ........... G01M 15/05; G05B 23/0283; G05B 2219/45071; B64F 5/60; G06N 3/0472; F05D 2260/80
See application file for complete search history.

(56) References Cited

U.S. PATENT DOCUMENTS

| | | | |
|---|---|---|---|
| 7,860,635 B2 * | 12/2010 | Litt | G01M 15/14 701/100 |
| 8,060,340 B2 * | 11/2011 | Gao | G05B 13/04 702/182 |

(Continued)

FOREIGN PATENT DOCUMENTS

| | | |
|---|---|---|
| CN | 105868467 A | 8/2016 |
| CN | 107655962 A | 2/2018 |
| CN | 109612738 A | 4/2019 |

OTHER PUBLICATIONS

Zhang, Shu-gang, "Key Technologies of On-board Health Diagnosis for Civil Turbofan Engine", Dissertation, Northwestern Polytechnical University, Aerospace Propulsion Theory and Engineering, Jun. 2014, entire document.

*Primary Examiner* — Russell Frejd
(74) *Attorney, Agent, or Firm* — Muncy, Geissler, Olds & Lowe, P.C.

(57) ABSTRACT

A stochastic configuration network based turbofan engine health parameter estimation method is disclosed. The stochastic configuration network based turbofan engine health parameter estimation method designed by the present invention combines the model based Kalman filter algorithm and the data-driven based stochastic configuration network, i.e. using the output of the stochastic configuration network as the compensation of the Kalman filter algorithm, so as to take into account the estimated result of the Kalman filter and the estimated result of the stochastic configuration network and improve the estimation accuracy of the original Kalman filter algorithm when the measurable parameters of the turbofan engine are less than the health parameters to be estimated. In addition, the present invention effectively reduces the accuracy loss caused by the poor structure of the neural network through the stochastic configuration net- (Continued)

work, and improves the generalization ability of the network.

1 Claim, 13 Drawing Sheets

(51) Int. Cl.
    *B64F 5/60*              (2017.01)
    *G05B 23/02*           (2006.01)

(52) U.S. Cl.
    CPC ....... *G06N 3/0472* (2013.01); *F05D 2260/80* (2013.01); *G05B 2219/45071* (2013.01)

(56) References Cited

U.S. PATENT DOCUMENTS

| | | | |
|---|---|---|---|
| 8,185,292 B2 * | 5/2012 | Litt | G01M 15/14 |
| | | | 701/100 |
| 8,386,121 B1 * | 2/2013 | Simon | G01M 15/02 |
| | | | 701/30.7 |
| 10,343,784 B2 | 7/2019 | Nakhjavani | |
| 10,352,824 B2 * | 7/2019 | Long | G01M 15/14 |
| 10,442,547 B2 * | 10/2019 | Miller | B64D 45/00 |
| 10,496,086 B2 * | 12/2019 | Garciamoreno | G05B 23/0213 |
| 2009/0143871 A1 * | 6/2009 | Gao | G05B 13/04 |
| | | | 700/29 |
| 2017/0234224 A1 * | 8/2017 | Adibhatla | G05B 23/0289 |
| | | | 60/226.1 |
| 2019/0277155 A1 * | 9/2019 | Dowdell | B64D 45/00 |

\* cited by examiner

STOCHASTIC CONFIGURATION NETWORK BASED TURBOFAN ENGINE HEALTH PARAMETER ESTIMATION METHOD

TECHNICAL FIELD

The present invention belongs to the technical field of fault diagnosis of aero-engines, and particularly relates to a Stochastic Configuration Network (SCN) based turbofan engine health parameter estimation method.

BACKGROUND

An aero-engine is an important component of an aircraft, and the safety thereof has significant effect on aircraft safety. A turbofan engine has large thrust, high propulsion, low fuel consumption and long range, and is often used in military and civil fields. The majority of faults of a turbofan engine are gas path faults and can be divided into abrupt faults and performance degradation. The basis for realizing gas path fault diagnosis is the estimation of unmeasurable health parameters. The turbofan engine health parameters usually refer to mass flow and effectiveness factors of five kernel components: fan, low pressure compressor, high pressure compressor, low pressure turbine and high pressure turbine. The estimation of engine health parameters can help maintenance personnel better understand the current operating conditions of the engine, identify potential risks early, and reduce maintenance cost. At the same time, the engine can be controlled better in emergency situations, and the safety of the operating process can be improved. Therefore, the estimation of the turbofan engine health parameters has high value.

The existing literature indicates that the turbofan engine health parameter estimation methods are mainly divided into model based methods and data-driven based methods. First, in the model based health parameter estimation methods, the Kalman filter algorithm is the most widely used but has self-defects: 1) having higher requirements for engine model accuracy; and 2) being unable to perform accurate estimation in case that the number of engine sensors is less than that of parameters to be estimated. In addition, in the data-driven based methods, the neural network is the most successfully used and has highly nonlinear mapping ability but has self-defects: 1) being difficult to determine the optimal network structure, which may result in lack of accuracy; 2) affecting the generalization ability of the network due to poor network structure; and 3) consuming much training cost and time for large-scale training data. Therefore, in view of the above detects, the design of a new turbofan engine health parameter estimation method has great significance.

SUMMARY

In view of the problems of the model based Kalman filter algorithm and the data-driven based neural network algorithm in the existing turbofan engine gas path health parameter estimation methods, the present invention provides a Stochastic Configuration Network (SCN) based turbofan engine health parameter estimation method, which can realize the accurate estimation of health parameters in case that the number of measurable parameters of a turbofan engine is less than that of health parameters to be estimated by constructing a stochastic configuration network and improved Kalman filter based health parameter estimator and optimizing the key parameters of the estimator based on the firefly algorithm. Meanwhile, the stochastic configuration network can determine the network structure by adaption of the scale of the stochastic parameter, learn fast and acquire good generalization ability.

The technical solution of the present invention is:

A stochastic configuration network based turbofan engine health parameter estimation method, comprises the following steps:

step 1: establishing a state space model of a turbofan engine step 1.1: establishing an aero-thermodynamics model of the component level of the turbofan engine based on the volume method, which is expressed as:

$$\begin{cases} \dot{x} = f(x, h, u) \\ y_m = g_m(x, h, u) \\ y_u = g_u(x, h, u) \end{cases}$$

wherein $x=[N_l, N_h]^T \in R^2$, $N_l$ is the fan rotary speed, $N_h$ is the compressor rotary speed, and $R^2$ is a two-dimensional real vector; $h=[c\_mf, c\_etaf, c\_mc, c\_etac]^T \in R^2$, $c\_mf$ is the fan mass flow, $c\_etaf$ is the fan effectiveness, $c\_mc$ is the compressor mass flow, and $c\_etac$ is the compressor effectiveness; $u=[W_{fm}, A_8]^T \in R^2$, $W_{fm}$ is the fuel flow, and $A_8$ is the nozzle area; $y_m=[N_l, N_h, T_{25}, T_6, P_6]^T \in R^2$, $N_l$ is the fan rotary speed, $N_h$ is the compressor rotary speed, $T_{25}$ is the compressor inlet total temperature, $T_6$ is the low pressure turbine exit temperature, and $P_6$ is the low pressure turbine exit pressure; and $y_u=[Pit, T_{41c}]^T \in R^2$, $Pit$ is the turbine nozzle pressure ratio, and $T_{41c}$ is the turbine inlet temperature;

step 1.2: at a steady-state point $(x_{ss}, u_{ss}, y_{ss}, h_{ref})$, linearizing the aero-thermodynamics model of the component level of the turbofan engine into a small perturbation state variable model, which is expressed as:

$$\begin{cases} \Delta\dot{x} = A\Delta x + B\Delta u + L\Delta h + v \\ \Delta y_m = C_m\Delta x + D_m\Delta u + M_m\Delta h + w \\ \Delta y_u = C_u\Delta x + D_u\Delta u + M_u\Delta h \end{cases}$$

wherein $\Delta x = x - x_{ss}$, $\Delta u = u - u_{ss}$, $\Delta y = y - y_{ss}$, and $\Delta h = h - h_{ref}$; $A$, $B$, $L$, $C_m$, $D_m$, $M_m$, $C_u$, $D_u$ and $M_u$ are system matrices; $v$ and $w$ are respectively a system noise matrix and a measurement noise matrix, and the covariance matrices thereof are respectively $Q$ and $R$; and $x_{ss}$, $u_{ss}$ and $y_{ss}$ are respectively the steady states of the state vector $x$, the input vector $u$ and the output vector $y$, and $h_{ref}$ is the steady reference of the health parameter vector $h$;

step 1.3: normalizing the perturbation state variable model to improve the numerical stability step 1.4: taking the health parameter degradation as an augmented state variable, and the state space model of the turbofan engine is expressed as:

$$\begin{cases} \Delta\dot{x}_{aug} = A_{aug}\Delta x_{aug} + B_{aug}\Delta u + v \\ \Delta y_m = C_{aug,m}\Delta x_{aug} + D_{aug,m}\Delta u + w \\ \Delta y_u = C_{aug,u}\Delta x_{aug} + D_{aug,u}\Delta u \end{cases}$$

wherein $\Delta x_{aug} = [\Delta x, \Delta h]^T$, $A_{aug}=[A,L;0,0]$, $B_{aug}=[B,0]^T$, $C_{aug,m}=[C_m, M_m]$, $C_{aug,u}=[C_u, M_u]$, $D_{aug,m}=D_m$, $D_{aug,u}=D_u$, and the subscript "aug" is the augmented state;

step 2: collecting the measurable parameters in the case of gas path performance degradation of the turbofan engine, including the sensor measured value of the fan rotary speed $N_l$, the sensor measured value of the high pressure compressor rotary speed $N_h$, the sensor measured value of the high pressure compressor inlet total temperature $T_{25}$, the sensor measured value of the low pressure turbine exit temperature $T_6$, and the sensor measured value of the low pressure turbine exit pressure $P_6$, as the data set for realizing turbofan engine gas path health parameter estimation as well as the training data and test data for the constructed stochastic configuration network;

step 2.1: adopting the mean imputation method and the $3\sigma$ principle for data hygiene, and processing the missing values and outliers;

step 2.2: taking the deviation of the output of the real turbofan engine from the steady output as the input data of the training data, and taking the variations of the health parameters as the target data of the training data;

step 2.3: normalizing the training data, and saving the training data and the data information (maximum value and minimum value);

step 3: designing an improved hybrid Kalman filter according to the state space model of the turbofan engine, and adjusting the corresponding Kalman filter parameters;

step 3.1: setting the input of the improved hybrid Kalman filter to the measurable input deviation $\Delta y_m$ of the turbofan engine containing measurement noise, the state space model of the turbofan engine to the steady state reference model of the improved hybrid Kalman filter, and the output of the improved hybrid Kalman filter to the augmented state variable $x_{aug}=[N_l,N_h,c\_mf,c\_etaf,c\_mc,c\_etac]^T \in R^2$;

step 3.2: expressing the augmented state variable model of the improved hybrid Kalman filter as:

$$\begin{cases} \dot{\hat{x}}_{aug,0} = A_{aug}(\hat{x}_{aug,k} - \hat{x}_{aug,ss,k}) + K_k(y_{m,k} - \hat{y}_{m,k}) \\ \hat{y}_{m,k} = C_{aug,m}(\hat{x}_{aug,k} - \hat{x}_{aug,ss,k}) + \hat{y}_{m,ss,k} \end{cases}$$

wherein $\hat{x}_{aug,k}$ is the estimated augmented state variable of the improved hybrid Kalman filter at the k moment, $\hat{x}_{aug,ss,k}$ the steady augmented state variable at the k moment, $y_{m,k}$ is the measurable output of the turbofan engine at the k moment, $\hat{y}_{m,k}$ is the estimated measurable output of the improved hybrid Kalman filter at the k moment, $\hat{y}_{m,ss,k}$ is the steady measurable output at the k moment, $K_k$ is the Kalman gain matrix at the k moment, $K_k=P_k^- C_{aug,m}^T (C_{aug,m} P_k^- C_{aug,m}^T + R)^{-1}$, $P_k^-$ is the covariance matrix of prior state estimation error at the k moment, $P_k^- = A_{aug} P_{k-1}^+ A_{aug}^T + Q$, $P_k^+$ is the covariance matrix of posterior state estimation error at the k moment, and $P_k^+ = (I - K_k C_{aug,m}) P_k^-$; when k=0, $\hat{x}_{aug,0}^+$ and $P_0^+$ are initialized:

$$\begin{cases} \hat{x}_{aug,0}^+ = E(x_0) \\ P_0^+ = E[(x_0 - \hat{x}_0^+)(x_0 - \hat{x}_0^+)^T] \end{cases}$$

step 4: constructing a stochastic configuration network by using the training data and test data;

step 4.1: taking 70% of the normalized training data obtained in step 2.3 as the training data, and 30% as the test data;

step 4.2: letting the mapping relationship of L−1 hidden nodes added between the measurable parameter X and the health parameter to be estimated of the turbofan engine be expressed as $f_{L-1}(X)$, then:

$$f_{L-1}(X) = \sum_{i=1}^{L-1} \beta_i \cdot g_i(\omega_i^T \cdot X + b_i)(L = 1, 2, \ldots, f_0 = 0)$$

wherein $X=[N_l,N_h,c\_mf,c\_etaf,c\_mc,c\_etac]^T \in R^2$, $\omega_i$ is the input weight of the $i^{th}$ hidden node, $b_i$ is the bias of the $i^{th}$ hidden node, $g_i$ is the output of the $i^{th}$ hidden node, and $\beta_i$ is the output weight of the $i^{th}$ hidden node;

step 4.3: calculating the error $e_{L-1}=f-f_{L-1}=[e_{L-1,1}, \ldots, e_{L-1,4}]$ at this time, wherein f is the actual operation data of the turbofan engine; if the error meets the error threshold given by the training network, ending the training and returning the current network parameters; if the error does not meet the error threshold given by the training network, adding a new hidden node, i.e., randomly generating a new basis function $g_L$, wherein the randomly generated $g_L$ needs to meet the following inequality:

$$<e_{L-1,q},g_L>^2 \geq b_g^2 \delta_{L,q}, q=1,\ldots,4$$

wherein $b_g \in R^+$ and meets $0<\|g\|<b_g$, $\forall g$ belongs to the $L_2$ space tensor, and $e_{L-1,q}$ is the $q^{th}$ component of the error; $\delta_{L,q}=(1-r-\mu_L)\|e_{L-1,q}\|^2, q=1,\ldots,4$, wherein $0<r<1$, $\mu_L$ meets $\lim_{L \to \infty} \mu_L=0$ and $\mu_L \leq (1-r)$, $<\cdot,\cdot>$ expresses inner product operation, and $\|\cdot\|$ expresses Euclidean norm operation;

step 4.4: calculating the output weight $\beta_{L,q}$ of the hidden node, as shown in the following formula:

$$\beta_{L,q} = \frac{<e_{L-1,q}, g_L>}{\|g_L\|^2}, q=1,\ldots,4$$

step 4.5: calculating the error $e_L$ after adding the L hidden node; if the error meets the error threshold given by the training network, ending the training and returning the current network parameters; if the error does not meet the error threshold given by the training network, returning to step 4.2 to continue to add a hidden node until the error meets the error threshold given by the training network;

step 5: designing a stochastic configuration network based Kalman filter step 5.1: adding a penalty term to the cost function of the renewal process of the Kalman filter algorithm, wherein the penalty term is the quadratic sum of deviations from the current estimated result of the stochastic configuration network, thereby obtaining the cost function as follows:

$$J_k = (y_{m,k} - C_{aug,m}\hat{x}_{aug,k})^T R^{-1}(y_{m,k} - C_{aug,m}\hat{x}_{aug,k}) + (\hat{x}_{aug,k} - x_{SCN,k})^T (\beta R_w)^{-1}(\hat{x}_{aug,k} - x_{SCN,k})$$

wherein $x_{SCN,k}$ is the estimated result of the stochastic configuration network k at the SCN moment; $\beta$ is the scale factor; $R_w$ is the diagonal matrix;

step 5.2: setting the input of the stochastic configuration network based Kalman filter to the measurable input deviation $\Delta y_m$ of the turbofan engine containing measurement noise and the deviation of the engine steady state output; and taking the output of the state space model of the engine directly as the steady state reference model of the stochastic configuration network based Kalman filter, and the output of the stochastic configuration network based Kalman filter as the augmented state variable $x=[N_l,N_h,c\_mf,c\_etaf,c\_mc,c\_etac]^T$, wherein $N_l$ is the fan rotary speed, $N_h$ is the compressor rotary speed, c_mf is the fan mass flow, c_etaf is the fan effectiveness, c_mc is the compressor mass flow, and c_etac is the compressor effectiveness;

step 5.3: on the basis of step 3, normalizing and taking the deviation of the output of the real turbofan engine from the steady output as the input of the stochastic configuration network, and then outputting the variation of the health parameter after inverse normalization;

step 5.4: adding constraints $\Delta c_{mf} \leq 0$, $\Delta c_{etaf} \leq 0$, $\Delta c_{mc} \leq 0$, $\Delta c\_etac \leq 0$ to the output end of the stochastic configuration network;

step 5.5: expressing the augmented state variable model of the stochastic configuration network based Kalman filter as:

$$\begin{cases} \dot{\hat{x}}_{aug,k} = A_{aug}(\hat{x}_{aug,k} - \hat{x}_{aug,ss,k}) + K_k(y_{m,k} - \hat{y}_{m,k}) + K'_k(x_{SCN,k} - A_{aug}(\hat{x}_{aug,k} - \hat{x}_{aug,ss,k})) \\ \hat{y}_{m,k} = C_{aug,m}(\hat{x}_{aug,k} - \hat{x}_{aug,ss,k}) + \hat{y}_{m,ss,k} \end{cases}$$

wherein $K_k$ is the Kalman gain at the k moment:

$$K_k = P'_k C_{aug,m}^T (C_{aug,m} P'_k C_{aug,m}^T + R)^{-1}$$

$K'_k$ is the stochastic configuration network gain at the k moment:

$$K'_k = (I - K_k C_{aug,m}) P'_k (\beta R_w)^{-1}$$

$P'_k$ is the covariance matrix of state estimation error at the k moment:

$$P'_k = P_k^- - P_k^- (P_k^- + \beta R_w)^{-1} P_k^-$$

wherein $P_k^-$ is the covariance matrix of prior state estimation error at the k moment, $P_k^- = A_{aug} P_{k-1}^+ A_{aug}^T + Q$, $P_k^+$ is the covariance matrix of posterior state estimation error at the k moment, and $P_k^+ = (I - K_k C_{aug,m}) P'_k - K'_k (\beta R_w - P'_k) K'^T_k$; when k=0, $\hat{x}_{aug,0}^+$ and $P_0^+$ are initialized:

$$\begin{cases} \hat{x}_{aug,0}^+ = E(x_0) \\ P_0^+ = E[(x_0 - \hat{x}_0^+)(x_0 - \hat{x}_0^+)^T] \end{cases}$$

step 6: optimizing the scale factor $\beta$ of SCN in the stochastic configuration network based Kalman filter and SCN output gains $K_1, K_2$ respectively corresponding to two health parameters with large errors based on the Firefly Algorithm (FA);

step 6.1: determining the firefly population size, and the number of the parameters to be optimized is three, respectively the scale factor $\beta$ corresponding to SCN in the structure, and SCN output gains $K_1, K_2$ respectively corresponding to two health parameters with large errors; letting the firefly population size be n and the dimension of the problem domain be 3, then the firefly population of the parameters to be optimized is expressed by a matrix of n×3; and letting the health parameter estimated value of the output of the stochastic configuration network based Kalman filter be y, the desired output be d, and the cost function J be the root mean square error (RMSE) sum of the health parameters, then defining as follows:

$$J = \sum_{i=1}^{m} \sqrt{\frac{1}{N} \sum_{j=i}^{N} (y_j - d_j)^2}$$

wherein m is the number of the health parameters, N is the number of the sampling points, $y_j$ is the health parameter estimated value of the $j^{th}$ sampling, and $d_j$ is the desired output of the $j^{th}$ sampling;

step 6.2: initializing the algorithm parameters, including the firefly population size n, the step $\alpha$, the maximum attraction $\varphi_0$, the absorption coefficient $\gamma$, the maximum iteration number and the accuracy $\varepsilon$;

step 6.3: randomly initializing the position of each firefly, and expressing the individual position vector of the firefly as $p(t)=(\beta, K_1, K_2)$; calculating the cost function value of each firefly as the maximum luminescence intensity $I_0$ thereof, wherein $I_0$ is the root mean square error sum of the health parameters obtained by simulation of the stochastic configuration network based Kalman filter of the parameters $\beta, K_1, K_2$; and the random initialization range of $\beta$ is 1000 to 100000, the random initialization range of $K_1$ is −2 to −0.5, and the random initialization range of $K_2$ is −2 to −0.5;

step 6.4: calculating the relative intensity I of the firefly, calculating the attraction $\varphi$, and determining the moving direction of the firefly according to the relative intensity; the relative intensity is $I = I_0 e^{-\gamma r_{ij}}$, wherein $\gamma$ is the absorption coefficient, $r_{ij}$ is the distance between the fireflies i and j, and $r_{ij} = \|p_i - p_j\| = \sqrt{\sum_{v=1}^{w}(p_i^v - p_j^v)^2}$; and $p_i^v$ is the $i^{th}$ component of the position vector of the $v^{th}$ firefly w is the number of components of the position vector of the firefly, and the attraction is $\varphi = \varphi_0 e^{-\gamma r_{ij}^2}$, wherein $\varphi_0$ is the maximum attraction;

step 6.5: updating the position of the firefly, and the iteration of position is as follows:

$$p_i(t+1) = p_i(t) + \varphi(p_j(t) - p_i(t)) + \alpha \varepsilon^t$$

wherein $p_i(t)$ and $p_j(t)$ are the spatial positions of two fireflies i, j at the t moment, $\alpha$ is the step, and $\varepsilon$ is the random factor of uniform distribution;

step 6.6: recalculating the maximum luminescence intensity $I_0$ of the firefly according to the updated position;

step 6.7: making a conditional judgment, and if the accuracy or the maximum number of searches is met, stopping iteration and returning the current parameter; otherwise, performing the next iteration, and returning to step 6.4 to continue search;

step 7: estimating the health parameters of the gas path components in the case of gas path performance degradation of the turbofan engine based on the acquired optimum parameters.

The present invention has the following beneficial effects that: the stochastic configuration network (SCN) based turbofan engine health parameter estimation method designed by the present invention combines the model based Kalman filter algorithm and the data-driven based stochastic configuration network, i.e. using the output of the stochastic configuration network as the compensation of the Kalman filter algorithm, so as to take into account the estimated result of the Kalman filter and the estimated result of the stochastic configuration network and improve the estimation accuracy of the original Kalman filter algorithm when the measurable parameters of the turbofan engine are less than the health parameters to be estimated. In addition, the present invention effectively reduces the accuracy loss caused by the poor structure of the neural network through the stochastic configuration network, and improves the generalization ability of the network. Meanwhile, the firefly algorithm is used to optimize the parameters in the structure of the stochastic configuration network based Kalman filter, thereby enhancing the estimation accuracy of the algorithm.

DETAILED DESCRIPTION

The embodiments of the present invention will be further described in detail below in combination with the drawings and the technical solution.

Figure 1:
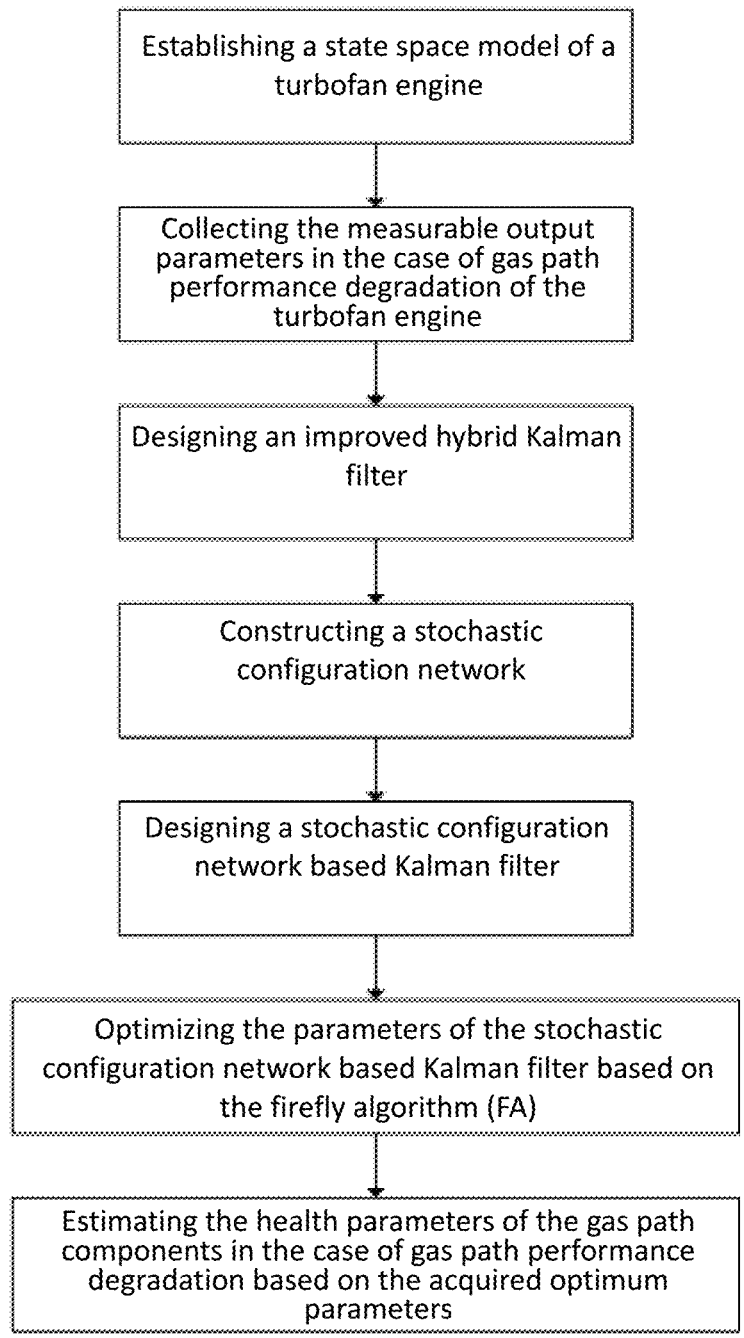
FIG. 1 is a flow chart of an algorithm of the present invention.

The flow chart of the present invention is shown in FIG. 1, and comprises the following specific steps:

Step 1: establishing a state space model of a turbofan engine.

Step 1.1: establishing an aero-thermodynamics model of the component level of the turbofan engine based on the volume method, which is expressed as:

$$\begin{cases} \dot{x} = f(x, h, u) \\ y_m = g_m(x, h, u) \\ y_u = g_u(x, h, u) \end{cases}$$

wherein $x=[N_l,N_h]^T \in R^2$, $N_l$ is the fan rotary speed, $N_h$ is the compressor rotary speed, and $R^2$ is a two-dimensional real vector; $h=[c\_mf,c\_etaf,c\_mc,c\_etac]^T \in R^2$, $c\_mf$ is the fan mass flow, $c\_etaf$ is the fan effectiveness, $c\_mc$ is the compressor mass flow, and $c\_etac$ is the compressor effectiveness; $u=[W_{fm},A_8]^T \in R^2$, $W_{fm}$ is the fuel flow, and $A_8$ is the nozzle area; $y_m=[N_l,N_h,T_{25},T_6,P_6]^T \in R^2$, $N_l$ is the fan rotary speed, $N_h$ is the compressor rotary speed, $T_{25}$ is the compressor inlet total temperature, $T_6$ is the low pressure turbine exit temperature, and $P_6$ is the low pressure turbine exit pressure; and $y_u=[Pit,T_{41c}]^T \in R^2$, $Pit$ is the turbine nozzle pressure ratio, and $T_{41c}$ is the turbine inlet temperature.

Step 1.2: at a steady-state point $(x_{ss}, u_{ss}, y_{ss}, h_{ref})$, linearizing the aero-thermodynamics model of the component level of the turbofan engine into a small perturbation state variable model, which is expressed as:

$$\begin{cases} \Delta \dot{x} = A\Delta x + B\Delta u + L\Delta h + v \\ \Delta y_m = C_m\Delta x + D_m\Delta u + M_m\Delta h + w \\ \Delta y_u = C_u\Delta x + D_u\Delta u + M_u\Delta h \end{cases}$$

wherein $\Delta x=x-x_{ss}$, $\Delta u=u-u_{ss}$, $\Delta y=y-y_{ss}$, and $\Delta h=h-h_{ref}$; A, B, L, $C_m$, $D_m$, $M_m$, $C_u$, $D_u$ and $M_u$ are system matrices; v and w are respectively a system noise matrix and a measurement noise matrix, and the covariance matrices thereof are respectively Q and R; $x_{ss}$, $u_{ss}$ and $y_{ss}$ are respectively the steady states of the state vector x, the input vector u and the output vector y, and $h_{ref}$ is the steady reference of the health parameter vector h, wherein $$A = \begin{bmatrix} -5.793798 & 4.0148752 \\ -0.43830061 & -4.256786 \end{bmatrix}$$

$$B = \begin{bmatrix} 4.87630775 & 0.7923824 \\ 1.35719503 & 0.50754869 \end{bmatrix}$$

$$L = \begin{bmatrix} -2.93781312 & 2.3776834 & 1.15534939 & -0.34205174 \\ -0.65816297 & -0.42863422 & -1.41218544 & 1.77603412 \end{bmatrix}$$

$$C_m = \begin{bmatrix} 1 & 0 \\ 0 & 1 \\ 0.66770884 & -0.1069179 \\ 0.22325865 & -1.74290814 \\ 1.16885842 & 0.24067402 \end{bmatrix}$$

$$D_m = \begin{bmatrix} 0 & 0 \\ 0 & 0 \\ -0.46637526 & -0.17875308 \\ 0.32320796 & 0.03427338 \\ -0.87626805 & -0.82360274 \end{bmatrix}$$

$$M_m = \begin{bmatrix} 0 & 0 & 0 & 0 \\ 0 & 0 & 0 & 0 \\ 0.27963731 & -0.32304026 & -0.03112819 & 0.01120396 \\ -0.12620059 & -0.42571701 & -0.45810294 & -0.17899572 \\ 0.98503232 & 0.11700595 & 0.06061545 & 0.04641769 \end{bmatrix}$$

-continued $$C_u = \begin{bmatrix} -1.00224366 & 2.15373277 \\ 0.01205461 & -1.37262334 \end{bmatrix}$$

$$D_u = \begin{bmatrix} 0.95929703 & 0.55336043 \\ 0.55364027 & 0.15613728 \end{bmatrix}$$

$$M_u = \begin{bmatrix} -0.5503044 & -0.33343 & 0.60645029 & -0.08786392 \\ -0.25182578 & -0.7962574 & -0.35161513 & -0.21270673 \end{bmatrix}$$

Step 1.3: normalizing the perturbation state variable model to improve the numerical stability.

Step 1.4: taking the health parameter degradation as an augmented state variable, and the state space model of the turbofan engine is expressed as:

$$\begin{cases} \Delta \dot{x}_{aug} = A_{aug} \Delta x_{aug} + B_{aug} \Delta u + v \\ \Delta y_m = C_{aug,m} \Delta x_{aug} + D_{aug,m} \Delta u + w \\ \Delta y_u = C_{aug,u} \Delta x_{aug} + D_{aug,u} \Delta u \end{cases}$$

wherein $\Delta x_{aug} = [\Delta x, \Delta h]^T$, $A_{aug} = [A, L; 0, 0]$, $B_{aug} = [B, 0]^T$, $C_{aug,m} = [C_m, M_m]$, $C_{aug,u} = [C_u, M_u]$, $D_{aug,m} = D_m$, $D_{aug,u} = D_u$, and the subscript "aug" is the augmented state;

$$A_{aug} = \begin{bmatrix} -5.793798 & 4.01468752 & -2.93781312 & 2.3776834 & 1.15534939 & -0.4205174 \\ -0.43830061 & -4.256786 & -0.65816297 & -0.48263422 & -1.41218544 & 1.77603412 \\ 0 & 0 & 0 & 0 & 0 & 0 \\ 0 & 0 & 0 & 0 & 0 & 0 \\ 0 & 0 & 0 & 0 & 0 & 0 \\ 0 & 0 & 0 & 0 & 0 & 0 \end{bmatrix}$$

$$B_{aug} = \begin{bmatrix} 4.87630775 & 0.7923824 \\ 1.35719503 & 0.50754869 \\ 0 & 0 \\ 0 & 0 \\ 0 & 0 \\ 0 & 0 \end{bmatrix}$$

$$C_{aug,m} = \begin{bmatrix} 1 & 0 & 0 & 0 & 0 & 0 \\ 0 & 1 & 0 & 0 & 0 & 0 \\ 0.66770884 & -0.1069179 & 0.27963731 & -0.32304026 & -0.03112819 & 0.01120396 \\ 0.22325865 & -1.74290814 & -0.12620059 & -0.42571701 & -0.45810294 & -0.17899572 \\ 1.16885842 & 0.24067402 & 0.98503232 & 0.11700595 & 0.06061545 & 0.04641769 \end{bmatrix}$$

$$C_{aug,u} = \begin{bmatrix} -1.00224366 & 2.15373277 & -0.5503044 & 0.33343 & 0.60645029 & -0.08786392 \\ 0.01205461 & -1.37262334 & -0.25182578 & -0.37962574 & -0.35161513 & -0.21270673 \end{bmatrix}$$

$$D_{aug,m} = \begin{bmatrix} 0 & 0 \\ 0 & 0 \\ -0.46637526 & -0.17875308 \\ 0.32320796 & 0.03427338 \\ -0.87626805 & -0.82360274 \end{bmatrix}$$

$$D_{aug,u} = \begin{bmatrix} 0.95929703 & 0.55336043 \\ 0.55364027 & 0.15613728 \end{bmatrix}$$

The steps of generating the training data for training the stochastic configuration network in step 2, are as follows:

Step 2.1: adopting the mean imputation method and the 3σ principle for data hygiene, and processing the missing values and outliers.

Step 2.2: taking the deviation of the output of the real turbofan engine from the steady output as the input data of the training data, and taking the variations of the health parameters as the target data of the training data.

Step 2.3: normalizing the training data, and saving the training data and the data information (maximum value and minimum value).

Wherein max_train is the maximum value of the training data, max_target is the maximum value of the target data, min_train is the minimum value of the training data, and min_target is the minimum value of the target data.

max_train=[530.228027 798.359690 9.642933 110.311463 0.003841]
max_target=[0.000000 0.000000 0.000000 0.000000]
min_train=[−441.747299 −472.819812 −3.759280 −2.559873 −0.242336]
min_target=[−0.100000 −0.100000 −0.100000 −0.100000]

Figure 2:
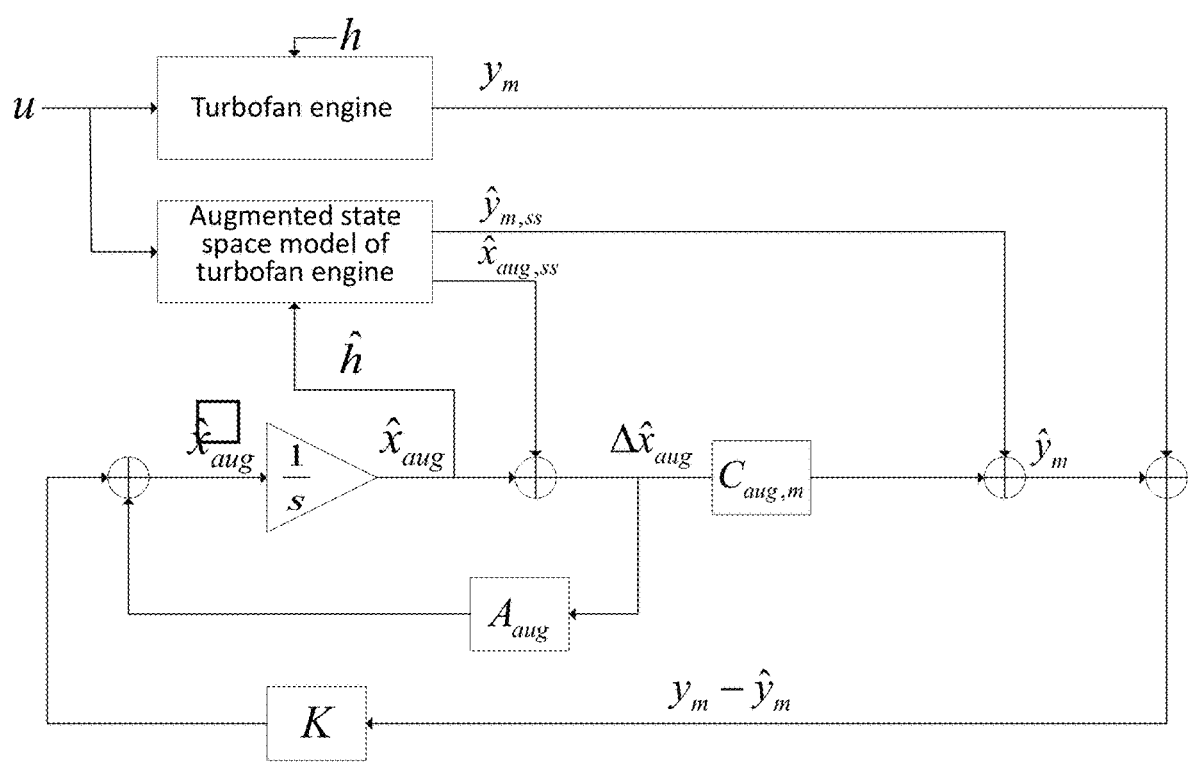
FIG. 2 a structural block diagram of an improved hybrid Kalman filter.

The design steps of the improved hybrid Kalman filter in step 3 are as follows, and the structural block diagram thereof is shown in FIG. 2:

Step 3.1: setting the input of the improved hybrid Kalman filter to the measurable input deviation $\Delta y_m$ of the turbofan engine containing measurement noise, the state space model of the turbofan engine to the steady state reference model of the improved hybrid Kalman filter, and the output of the improved hybrid Kalman filter to the augmented state variable $x_{aug} = [N_l, N_h, c\_mf, c\_etaf, c\_mc, c\_etac]^T \in R^2$.

Step 3.2: expressing the augmented state variable model of the improved hybrid Kalman filter as:

$$\begin{cases} \dot{\hat{x}}_{aug,0} = A_{aug}(\hat{x}_{aug,k} - \hat{x}_{aug,ss,k}) + K_k(y_{m,k} - \hat{y}_{m,k}) \\ \hat{y}_{m,k} = C_{aug,m}(\hat{x}_{aug,k} - \hat{x}_{aug,ss,k}) + \hat{y}_{m,ss,k} \end{cases}$$

wherein $\hat{x}_{aug,k}$ is the estimated augmented state variable of the improved hybrid Kalman filter at the k moment, $\hat{x}_{aug,ss,k}$ is the steady augmented state variable at the k moment, $y_{m,k}$ is the measurable output of the turbofan engine at the k moment, $\hat{y}_{m,k}$ is the estimated measurable output of the improved hybrid Kalman filter at the k moment, $\hat{y}_{m,ss,k}$ is the steady measurable output at the k moment, $K_k$ is the Kalman gain matrix at the k moment, $K_k = P_k^- C_{aug,m}^T (C_{aug,m} P_k^- C_{aug,m}^T + R)^{-1}$, $P_k^-$ is the covariance matrix of prior state estimation error at the k moment, $P_k^- = A_{aug} P_{k-1}^+ A_{aug}^T + Q$, $P_k^+$ is the covariance matrix of posterior state estimation error at the k moment, and $P_k^+ = (I - K_k C_{aug,m}) P_k^-$. When k=0, $\hat{x}_{aug,0}^+$ and $P_0^+$ are initialized:

$$\begin{cases} \hat{x}_{aug,0}^+ = E(x_0) \\ P_0^+ = E[(x_0 - \hat{x}_0^+)(x_0 - \hat{x}_0^+)^T] \end{cases}$$

$$Q = \begin{bmatrix} 6.4 \times 10^{-5} & 0 & 0 & 0 & 0 & 0 \\ 0 & 6.4 \times 10^{-5} & 0 & 0 & 0 & 0 \\ 0 & 0 & 6.4 \times 10^{-5} & 0 & 0 & 0 \\ 0 & 0 & 0 & 6.4 \times 10^{-5} & 0 & 0 \\ 0 & 0 & 0 & 0 & 6.4 \times 10^{-5} & 0 \\ 0 & 0 & 0 & 0 & 0 & 6.4 \times 10^{-5} \end{bmatrix}$$

$$R = \begin{bmatrix} 9 \times 10^{-6} & 0 & 0 & 0 & 0 & 0 \\ 0 & 9 \times 10^{-6} & 0 & 0 & 0 & 0 \\ 0 & 0 & 9 \times 10^{-6} & 0 & 0 & 0 \\ 0 & 0 & 0 & 9 \times 10^{-6} & 0 & 0 \\ 0 & 0 & 0 & 0 & 9 \times 10^{-6} & 0 \\ 0 & 0 & 0 & 0 & 0 & 9 \times 10^{-6} \end{bmatrix}$$

The steps of training the stochastic configuration network (SCN) in step 4 are as follows:

Step 4.1: taking 70% of the normalized training data obtained in step 2.3 as the training data, and 30% as the test data.

Step 4.2: letting the mapping relationship of L−1 hidden nodes added between the measurable parameter X and the health parameter to be estimated of the turbofan engine be expressed as $f_{L-1}(X)$, then:

$$f_{L-1}(X) = \sum_{i=1}^{L-1} \beta_i \cdot g_i(\omega_i^T \cdot X + b_i)(L = 1, 2, \ldots, f_0 = 0)$$

wherein $X = [N_l, N_h, c\_mf, c\_etaf, c\_mc, c\_etac]^T \in R^2$, $\omega_i$ is the input weight of the $i^{th}$ hidden node, $b_i$ is the bias of the $i^{th}$ hidden node, $g_i$ is the output of the $i^{th}$ hidden node, and $\beta_i$ is the output weight of the $i^{th}$ hidden node.

Step 4.3: calculating the error $e_{L-1} = f - f_{L-1} = [e_{L-1,1}, \ldots, e_{L-1,4}]$ at this time, wherein f is the actual operation data of the turbofan engine; if the error meets the error threshold given by the training network, ending the training and returning the current network parameters; if the error does not meet the error threshold given by the training network, adding a new hidden node, i.e., randomly generating a new basis function $g_L$, wherein the randomly generated $g_L$ needs to meet the following inequality:

$$<e_{L-1,q}, g_L>^2 \geq b_g^2 \delta_{L,q}, q=1,\ldots,4$$

wherein $b_g \in R^+$ and meets $0 < \|g\| < b_g$, $\forall g$ belongs to the $L_2$ space tensor, and $e_{L-1,q}$ is the $q^{th}$ component of the error; $\delta_{L,q} = (1 - r - \mu_L) \|e_{L-1,q}\|^2, q=1,\ldots,4$, wherein $0 < r < 1$, $\mu_L$ meets $\lim_{L \to \infty} \mu_L = 0$ and $\mu_L \leq (1-r)$, $<\cdot,\cdot>$ expresses inner product operation, and $\|\cdot\|$ expresses Euclidean norm operation;

step 4.4: calculating the output weight $\beta_{L,q}$ of the hidden node, as shown in the following formula:

$$\beta_{L,q} = \frac{<e_{L-1,q}, g_L>}{\|g_L\|^2}, q=1,\ldots,4$$

Step 4.5: calculating the error $e_L$ after adding the L hidden node; if the error meets the error threshold given by the training network, ending the training and returning the current network parameters; if the error does not meet the error threshold given by the training network, returning to step 4.2 to continue to add a hidden node until the error meets the error threshold given by the training network.

The parameters of the stochastic configuration network are set as follows:
W: [5×1000 double]
b: [1×1000 double]
β: [1000×4 double]
tol: 1.0000e−3
$L_{max}$: 1000
COST: 0.005316106352991 wherein W is the input weight matrix of the hidden node, b is the set over matrix of the hidden node, β is the output weight matrix of the hidden node, tol is the error threshold setting, $L_{max}$ is the maximum number of new hidden nodes, and COST is the training cost.

Figure 3:
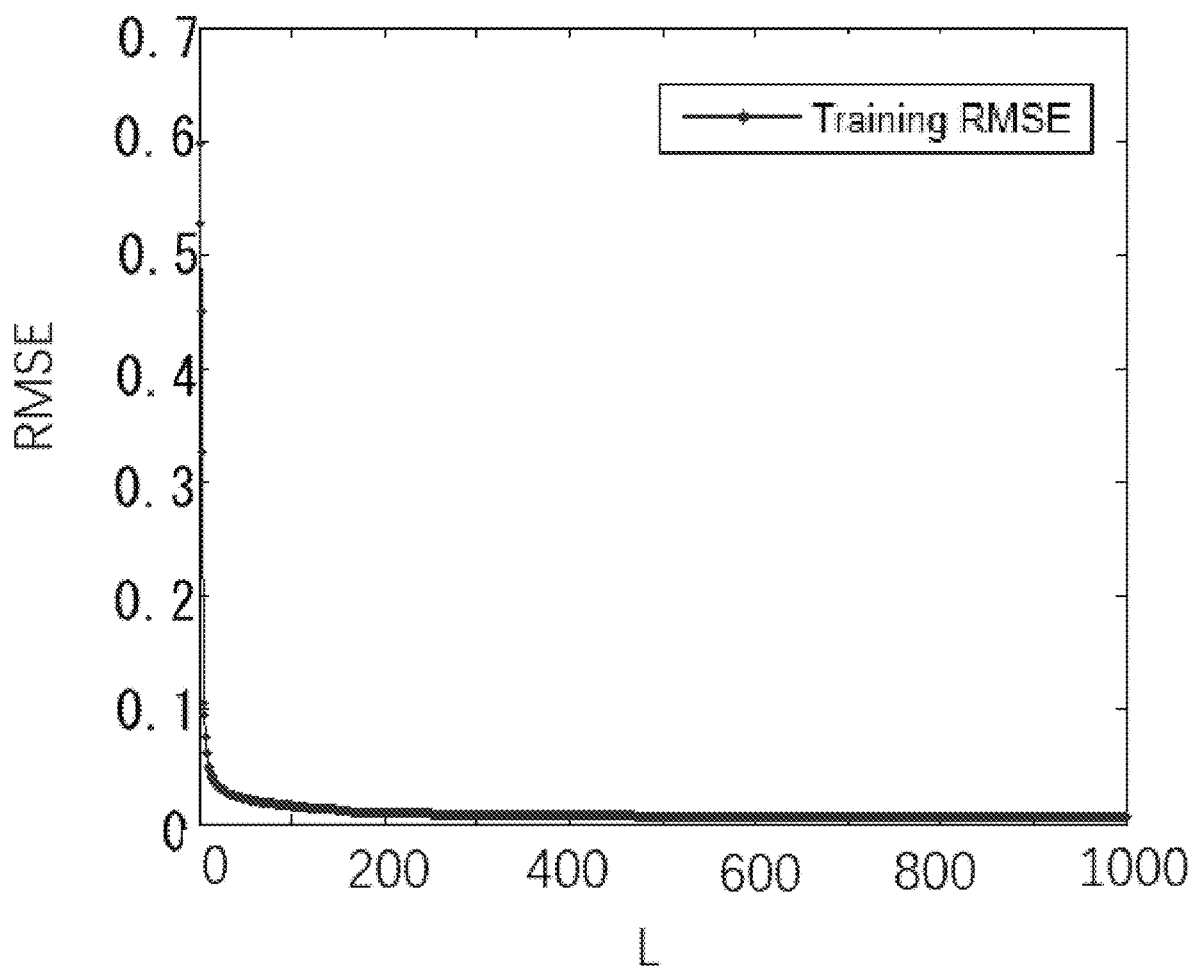
FIG. 3 is a curve of training accuracy of a stochastic configuration network.

The curve of training accuracy of the constructed stochastic configuration network is shown in FIG. 3.

Figure 4:
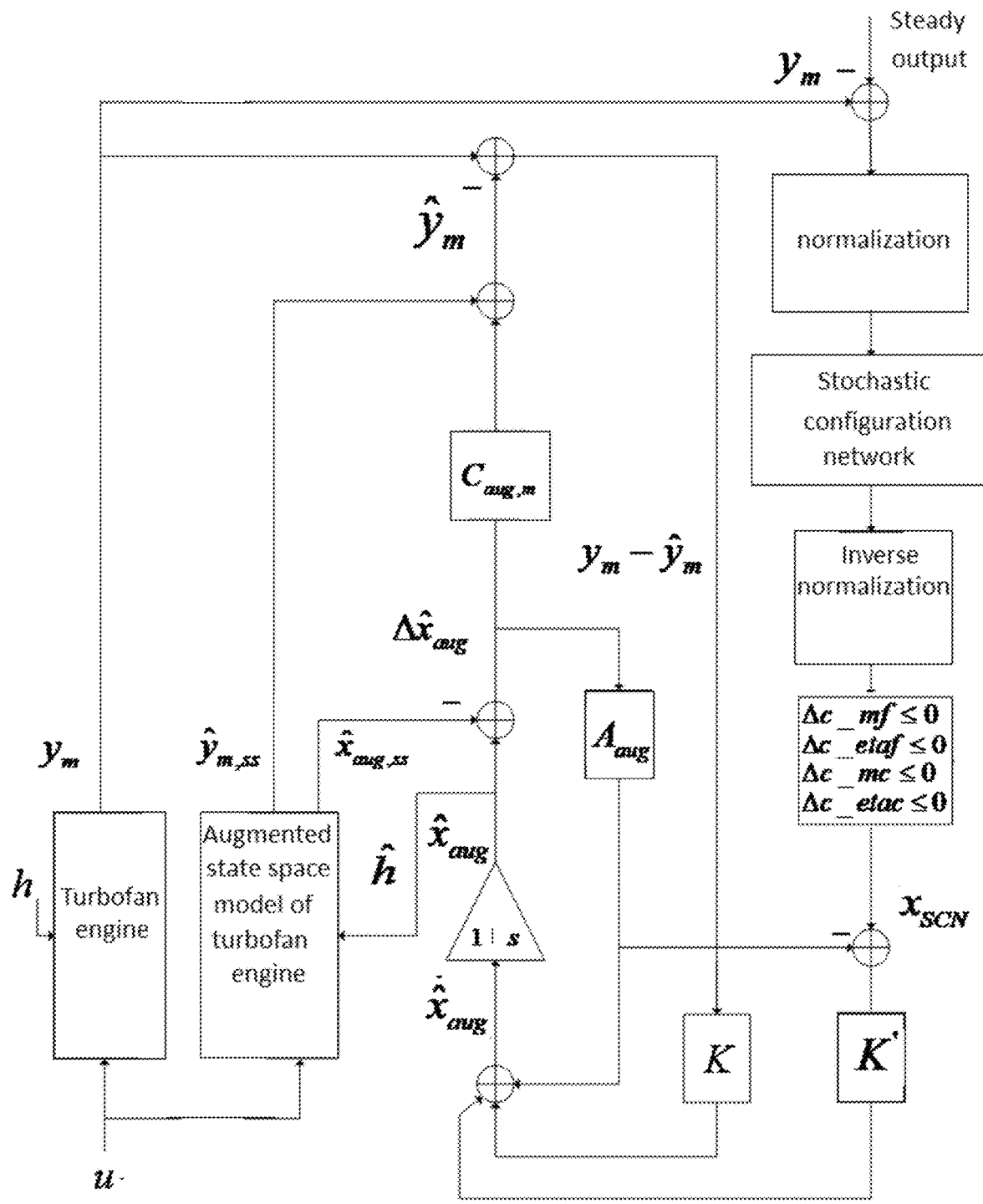
FIG. 4 is a structural block diagram of a stochastic configuration network based health parameter estimator.
Figure 5:
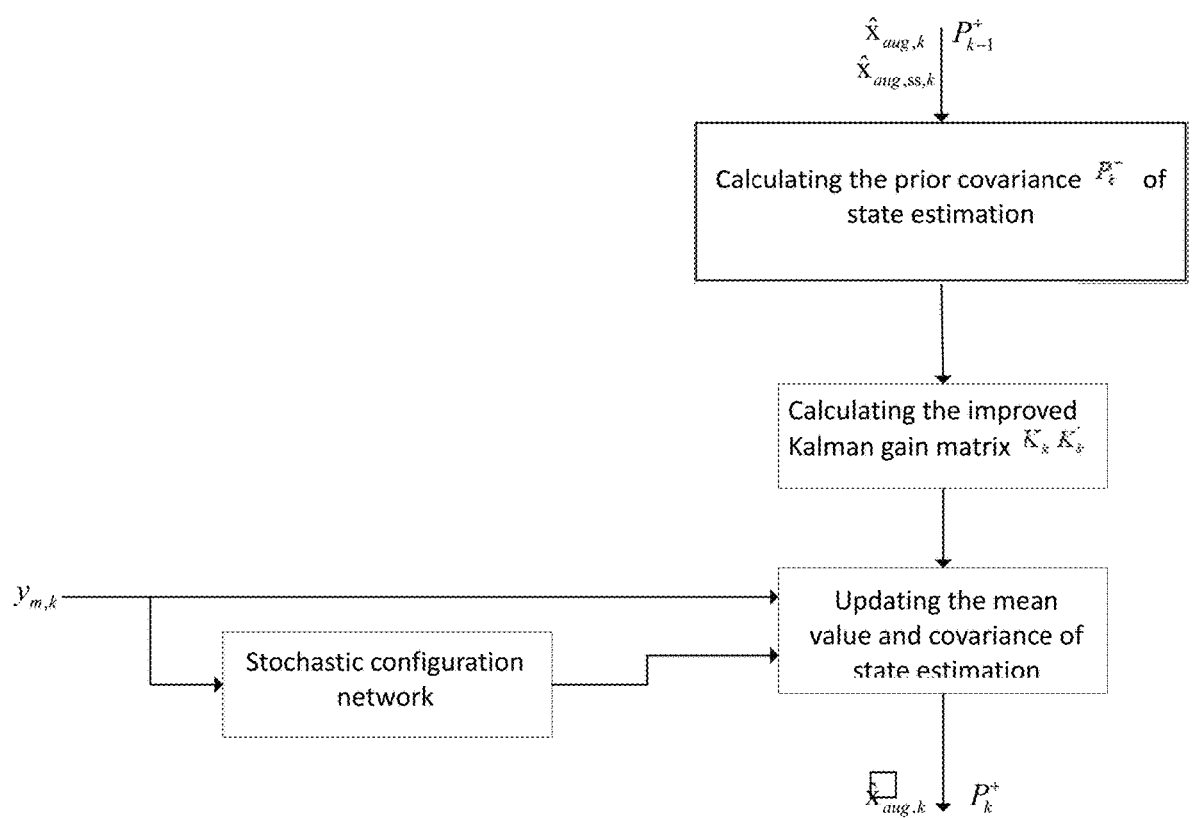
FIG. 5 is a flow chart of a stochastic configuration network based health parameter estimation algorithm.

As shown in FIG. 5, the steps of designing a stochastic configuration network based Kalman filter in step 5 are as follows, and the structural block diagram thereof is shown in FIG. 4:

Step 5.1: adding a penalty term to the cost function of the renewal process of the Kalman filter algorithm, wherein the penalty term is the quadratic sum of deviations from the current estimated result of the stochastic configuration network, thereby obtaining the cost function as follows:

$$J_k = (y_{m,k} - C_{aug,m}\hat{x}_{aug,k})^T R^{-1}(y_{m,k} - C_{aug,m}\hat{x}_{aug,k}) + (\hat{x}_{aug,k} - x_{SCN,k})^T (\beta R_w)^{-1}(\hat{x}_{aug,k} - x_{SCN,k})$$

wherein $x_{SCN,k}$ is the estimated result of the stochastic configuration network k at the SCN moment; $\beta$ is the scale factor; $R_w$ is the diagonal matrix;

step 5.2: setting the input of the stochastic configuration network based Kalman filter to the measurable input deviation $\Delta y_m$ of the turbofan engine containing measurement noise and the deviation of the engine steady state output; and taking the output of the state space model of the engine directly as the steady state reference model of the stochastic configuration network based Kalman filter, and the output of the stochastic configuration network based Kalman filter as the augmented state variable $x=[N_l, N_h, c\_mf, c\_etaf, c\_mc, c\_etac]^T$, wherein $N_l$ is the fan rotary speed, $N_h$ is the compressor rotary speed, c_mf is the fan mass flow, c_etaf is the fan effectiveness, c_mc is the compressor mass flow, and c_etac is the compressor effectiveness.

Step 5.3: on the basis of step 3, normalizing and taking the deviation of the output of the real turbofan engine from the steady output as the input of the stochastic configuration network, and then outputting the variation of the health parameter after inverse normalization.

Step 5.4: adding constraints $\Delta c_{mf} \leq 0, \Delta c_{etaf} \leq 0, \Delta c\_mc \leq 0, \Delta c\_etac \leq 0$ to the output end of the stochastic configuration network.

Step 5.5: expressing the augmented state variable model of the stochastic configuration network based Kalman filter as:

$$\begin{cases} \dot{\hat{x}}_{aug,k} = A_{aug}(\hat{x}_{aug,k} - \hat{x}_{aug,ss,k}) + K_k(y_{m,k} - \hat{y}_{m,k}) + \\ \quad K'_k(x_{SCN,k} - A_{aug}(\hat{x}_{aug,k} - \hat{x}_{aug,ss,k})) \\ \hat{y}_{m,k} = C_{aug,m}(\hat{x}_{aug,k} - \hat{x}_{aug,ss,k}) + \hat{y}_{m,ss,k} \end{cases}$$

wherein $K_k$ is the Kalman gain at the k moment:

$$K_k = P'_k C_{aug,m}^T (C_{aug,m} P'_k C_{aug,m}^T + R)^{-1}$$

$K'_k$ is the stochastic configuration network gain at the k moment:

$$K'_k = (I - K_k C_{aug,m}) P'_k (\beta R_w)^{-1}$$

$P'_k$ is the covariance matrix of state estimation error at the k moment:

$$P'_k = P_k^- - P_k^- (P_k^- + \beta R_w)^{-1} P_k^-$$

wherein $P_k^-$ is the covariance matrix of prior state estimation error at the k moment, $P_k^- = A_{aug} P_{k-1}^+ A_{aug}^T + Q$, $P_k^+$ is the covariance matrix of posterior state estimation error at the k moment, and $P_k^+ = (I - K_k C_{aug,m}) P'_k - K'_k (\beta R_w - P'_k) K'_k{}^T$. When k=0, $\hat{x}_{aug,0}^+$ and $P_0^+$ are initialized:

$$\begin{cases} \hat{x}_{aug,0}^+ = E(x_0) \\ P_0^+ = E[(x_0 - \hat{x}_0^+)(x_0 - \hat{x}_0^+)^T] \end{cases}$$

Figure 6A:
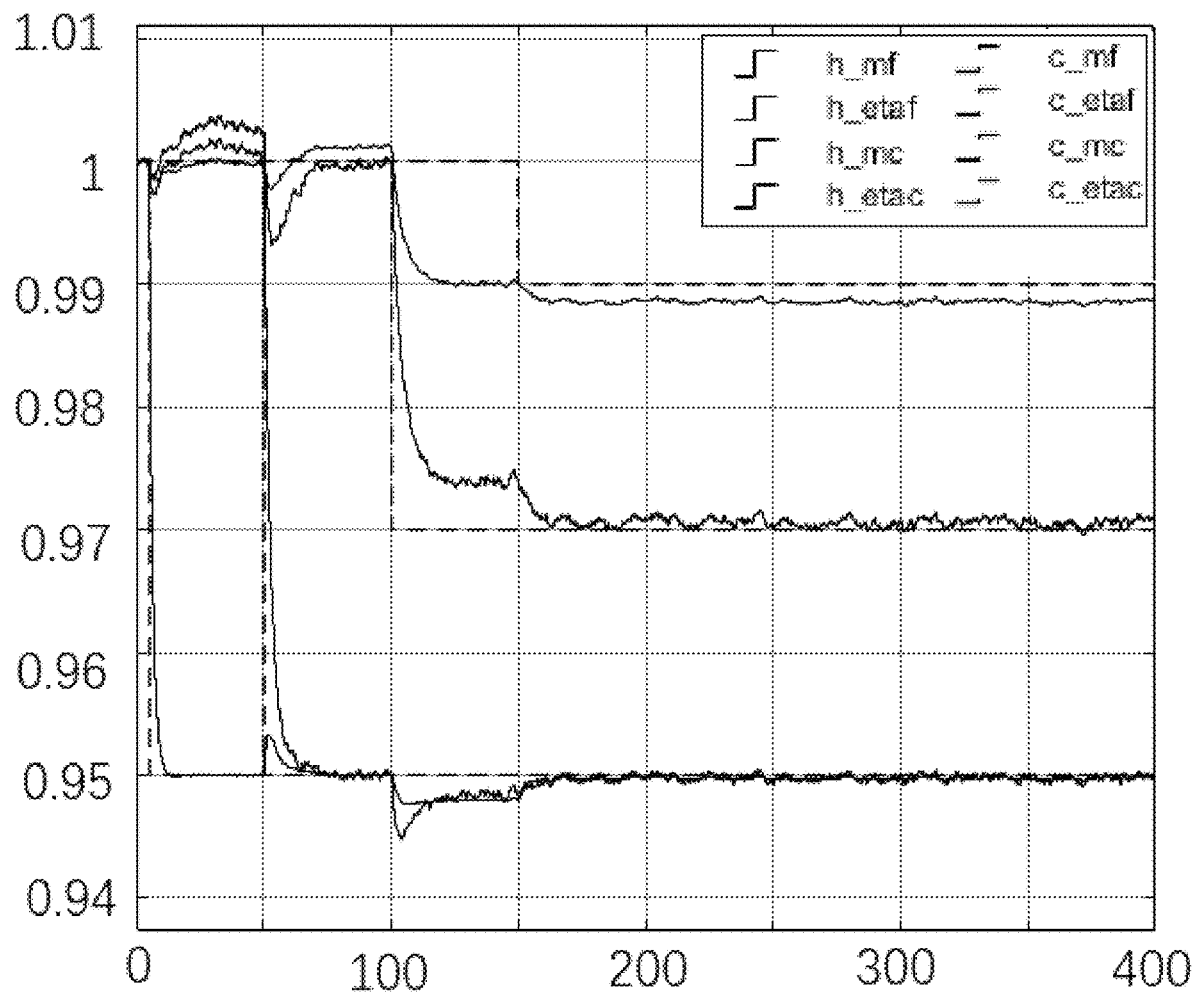
FIG. 6(a) and FIG. 6(b) respectively show estimated results of an original Kalman filter algorithm and a stochastic configuration network based health parameter estimation algorithm on health parameters under the working conditions of height H=5000, Mach number Ma=0 and main fuel flow Wfm=4500.
Figure 6B:
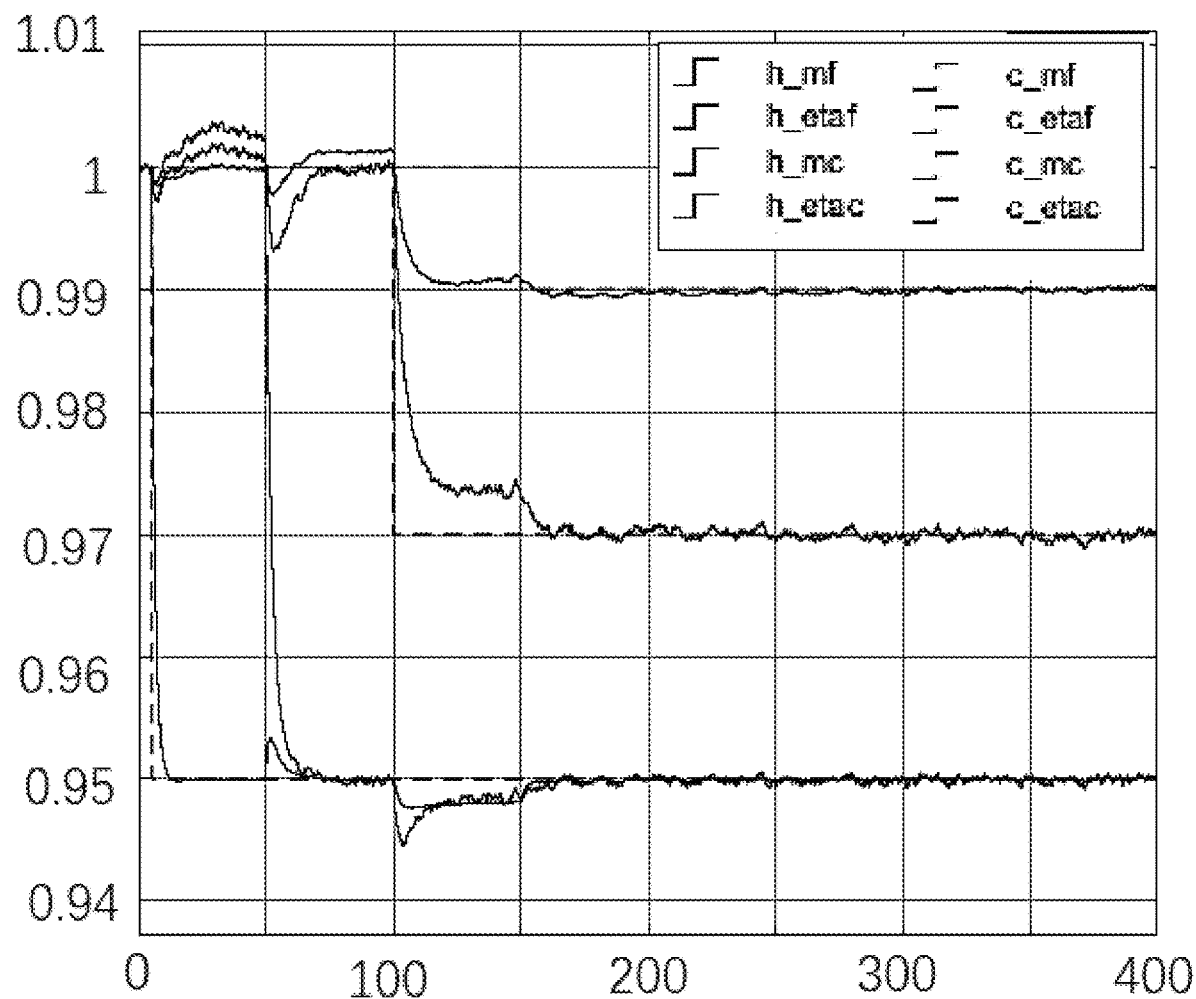
Figure 7:
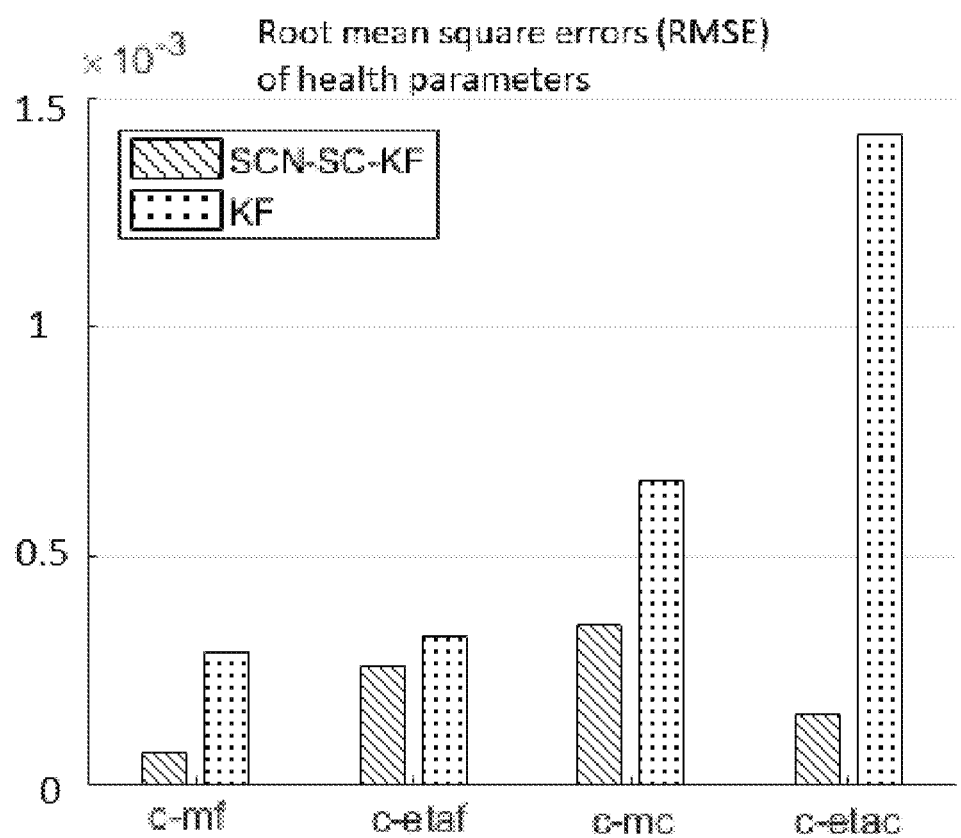
FIG. 7 shows the comparison of estimation accuracies of an original Kalman filter algorithm and a stochastic configuration network based health parameter estimation algorithm on a set of health parameters under the working conditions of H=5000, Ma=0 and Wfm=4500.

The estimated results of the original Kalman filter algorithm and the proposed stochastic configuration network based health parameter estimation algorithm on health parameters are shown in FIG. 6(a) and FIG. 6(b). FIG. 7 shows the comparison of estimation accuracies of the original Kalman filter algorithm and the stochastic configuration network based health parameter estimation algorithm on a set of health parameters. What is noteworthy is that the stochastic configuration network at this time is the estimation of a working condition when the structure parameters are not optimal. For the working condition, the stochastic configuration network has higher estimation accuracy than the original Kalman filter algorithm.

Figure 8:
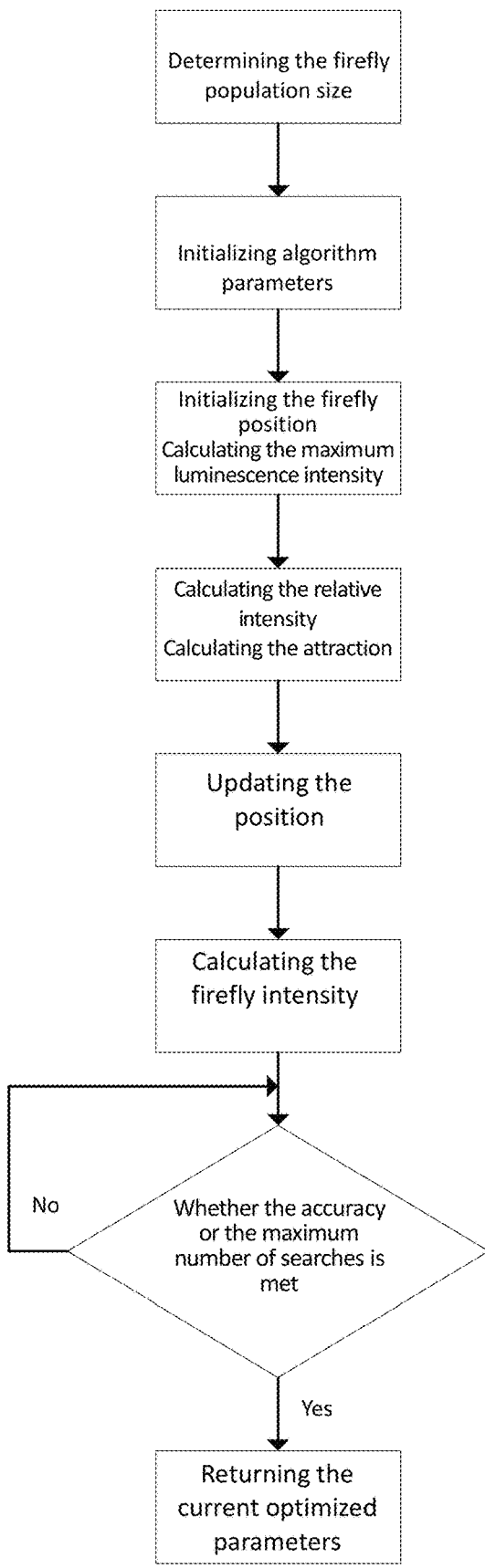
FIG. 8 is a flow chart of a firefly algorithm based parameter optimization algorithm.

As shown in FIG. 8, the steps of realizing parameter optimization based on the firefly algorithm (FA) in step 6 are as follows:

Step 6.1: determining the firefly population size, and the number of the parameters to be optimized is three, respectively the scale factor $\beta$ corresponding to SCN in the structure, and SCN output gains $K_1$, $K_2$ respectively corresponding to two health parameters with large errors. Letting the firefly population size be n and the dimension of the problem domain be 3, then the firefly population of the parameters to be optimized is expressed by a matrix of n×3; and letting the health parameter estimated value of the output of the stochastic configuration network based Kalman filter be y, the desired output be d, and the cost function J be the root mean square error (RMSE) sum of the health parameters, then defining as follows:

$$J = \sum_{i=1}^{m} \sqrt{\frac{1}{N} \sum_{j=i}^{N} (y_j - d_j)^2}$$

Wherein m is the number of the health parameters, N is the number of the sampling points, $y_j$ is the health parameter estimated value of the $j^{th}$ sampling, and $d_j$ is the desired output of the $j^{th}$ sampling;

Step 6.2: initializing the algorithm parameters, including the firefly population size n, the step $\alpha$, the maximum attraction $\varphi_0$, the absorption coefficient $\gamma$, the maximum iteration number and the accuracy $\varepsilon$.

The parameters are set as follows:

The number of fireflies is n=50, the step is $\alpha$=0.2, the maximum attraction is $\varphi_0$=1, the absorption coefficient is $\gamma$=1, the maximum iteration number is itermax=75, and the accuracy is $\varepsilon=10^{-3}$.

Step 6.3: randomly initializing the position of each firefly, and expressing the individual position vector of the firefly as $p(t)=(\beta, K_1, K_2)$; Calculating the cost function value of each firefly as the maximum luminescence intensity $I_0$ thereof, wherein $I_0$ is the root mean square error sum of the health parameters obtained by simulation of the stochastic configuration network based Kalman filter of the parameters $\beta, K_1, K_2$. The random initialization range of $\beta$ is 1000 to 100000, the random initialization range of $K_1$ is −2 to −0.5, and the random initialization range of $K_2$ is −2 to −0.5.

Step 6.4: calculating the relative intensity I of the firefly, calculating the attraction $\varphi$, and determining the moving direction of the firefly according to the relative intensity; the relative intensity is $I=I_0 e^{-\gamma r_{ij}}$, wherein $\gamma$ is the absorption coefficient, $r_{ij}$ is the distance between the fireflies i and j, and $r_{ij}=\|p_i-p_j\|\sqrt{\Sigma_{v=1}^{w}(p_i^v-p_j^v)^2}$; and $p_i^v$ is the $i^{th}$ component of the position vector of the $v^{th}$ firefly, w is the number of components of the position vector of the firefly, and the attraction is $\varphi=\varphi_0 e^{-\gamma r_{ij}^2}$, wherein $\varphi_0$ is the maximum attraction.

Step 6.5: updating the position of the firefly, and the iteration of position is as follows:

$$p_i(t+1)=p_i(t)+\varphi(p_j(t)-p_i(t))+\alpha\varepsilon^t$$

wherein $p_i(t)$ and $p_j(t)$ are the spatial positions of two fireflies i, j at the t moment, $\alpha$ is the step, and $\varepsilon$ is the random factor of uniform distribution.

Step 6.6: recalculating the maximum luminescence intensity $I_0$ of the firefly according to the updated position.

Step 6.7: making a conditional judgment, and if the accuracy or the maximum number of searches is met, stopping iteration and returning the current parameter; otherwise, performing the next iteration, and returning to step 6.4 to continue search.

The optimized parameters are returned as follows:
β: 24000
$K_1$: −1
$K_2$: −0.8

Step 7: estimating the health parameters of the gas path components in the case of gas path performance degradation of the turbofan engine based on the acquired optimum parameters.

Figure 9A:
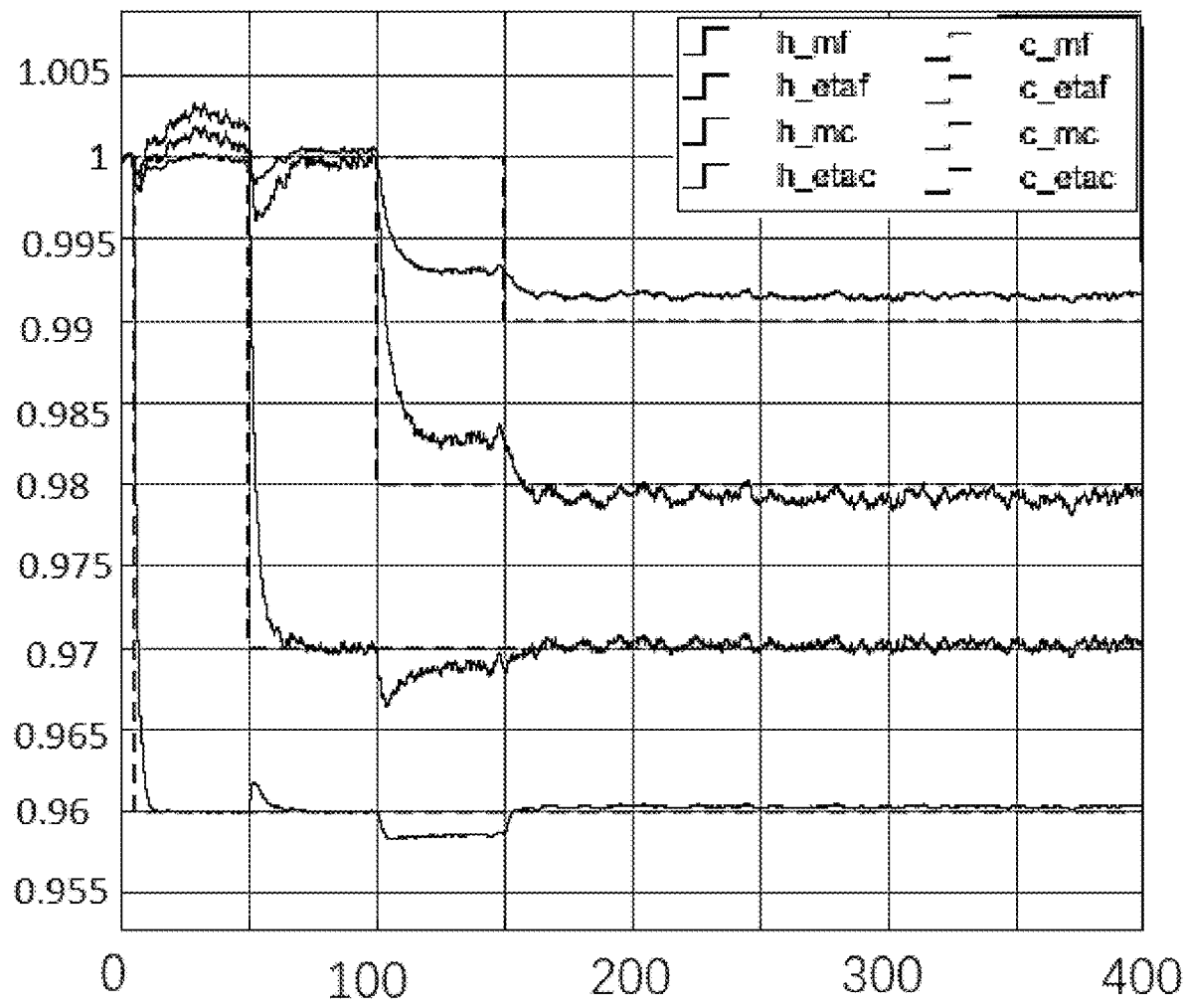
FIG. 9(a), FIG. 9(b) and FIG. 9(c) respectively show estimated results of an original Kalman filter algorithm, a stochastic configuration network based health parameter estimation algorithm with improper structure parameters and a stochastic configuration network based health parameter estimation algorithm optimizing structure parameters by a firefly algorithm on a set of health parameters under the working conditions of H=5000, Ma=0 and Wfm=4500.
Figure 9B:
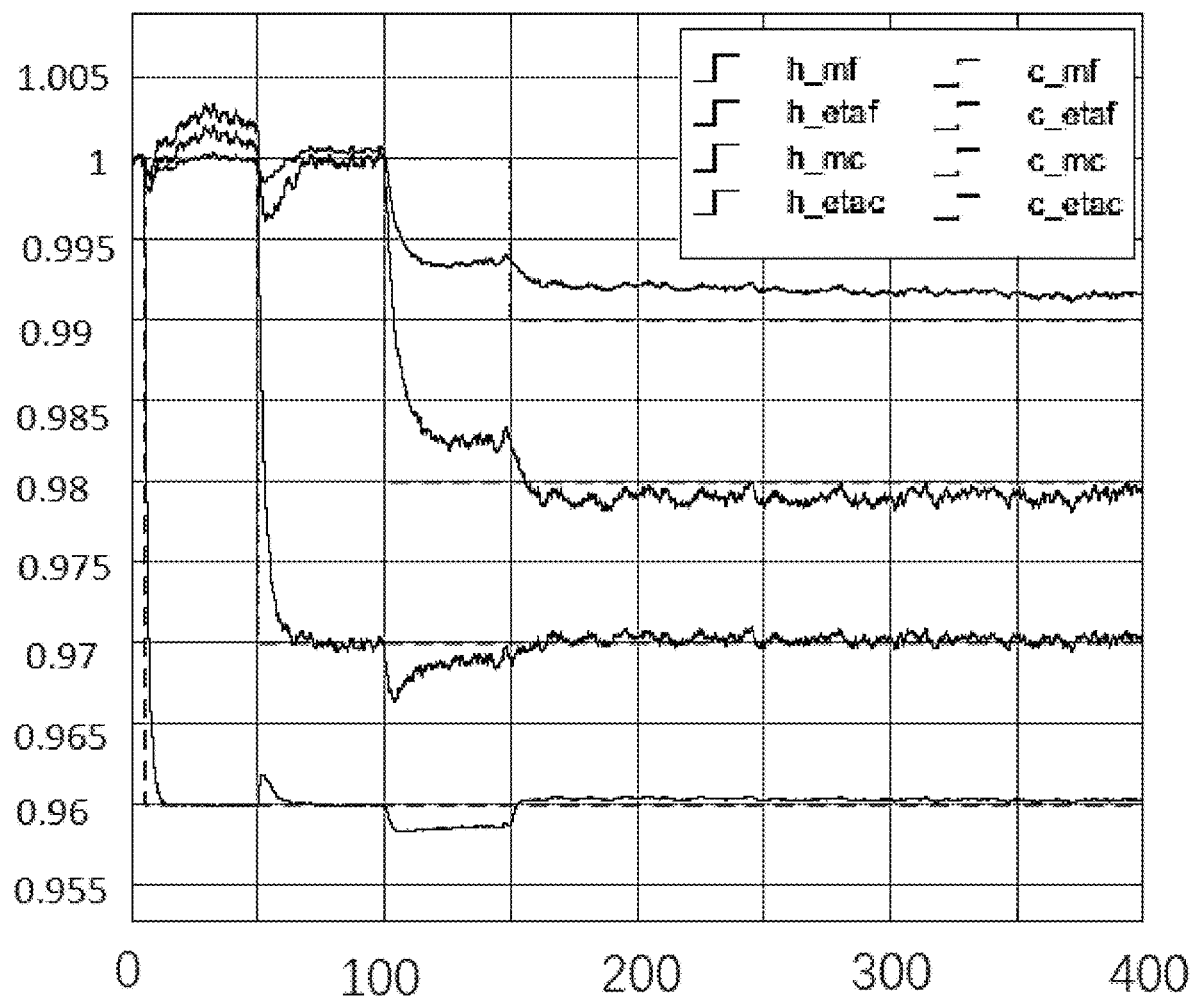
Figure 9C:
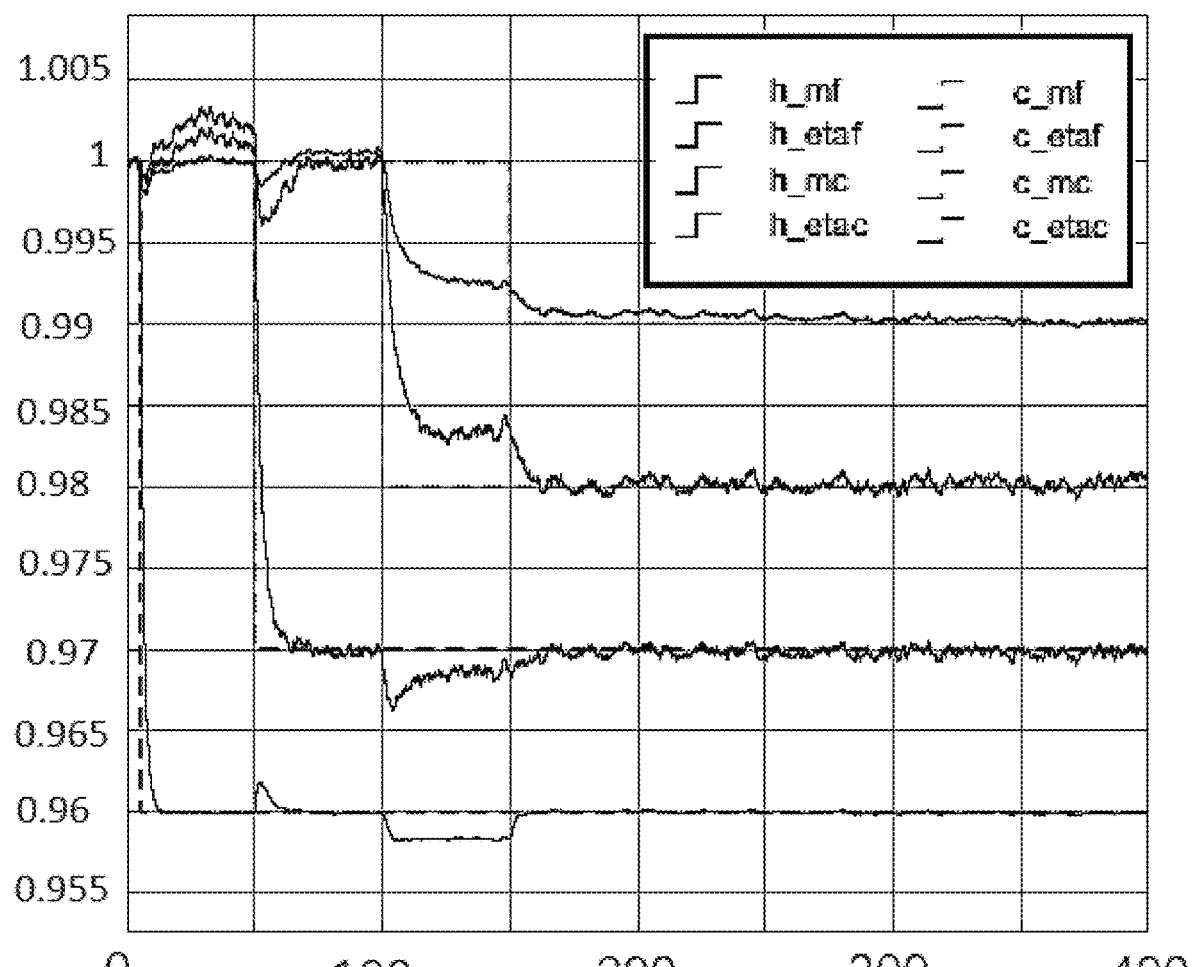
Figure 10A:
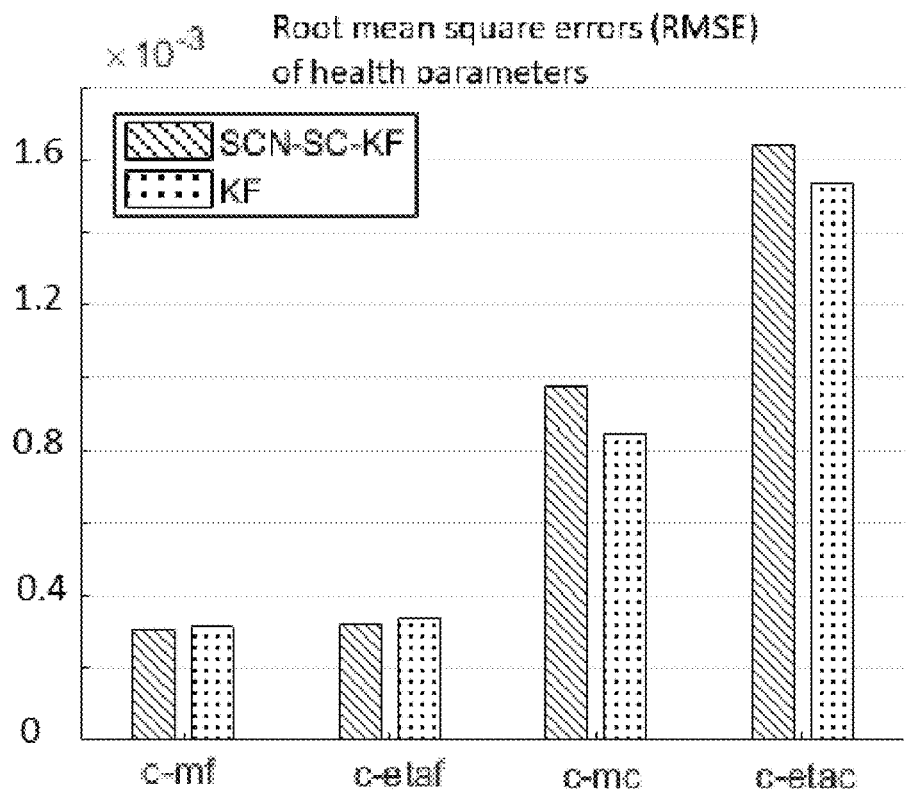
FIG. 10(a) and FIG. 10(b) respectively show the comparison of estimation accuracies of an original Kalman filter algorithm and a stochastic configuration network based health parameter estimation algorithm with improper structure parameters and the comparison of estimation accuracies of an original Kalman filter algorithm and a stochastic configuration network based health parameter estimation algorithm optimizing structure parameters by a firefly algorithm on a set of health parameters under the working conditions of H=5000, Ma=0 and Wfm=4500.
Figure 10B:
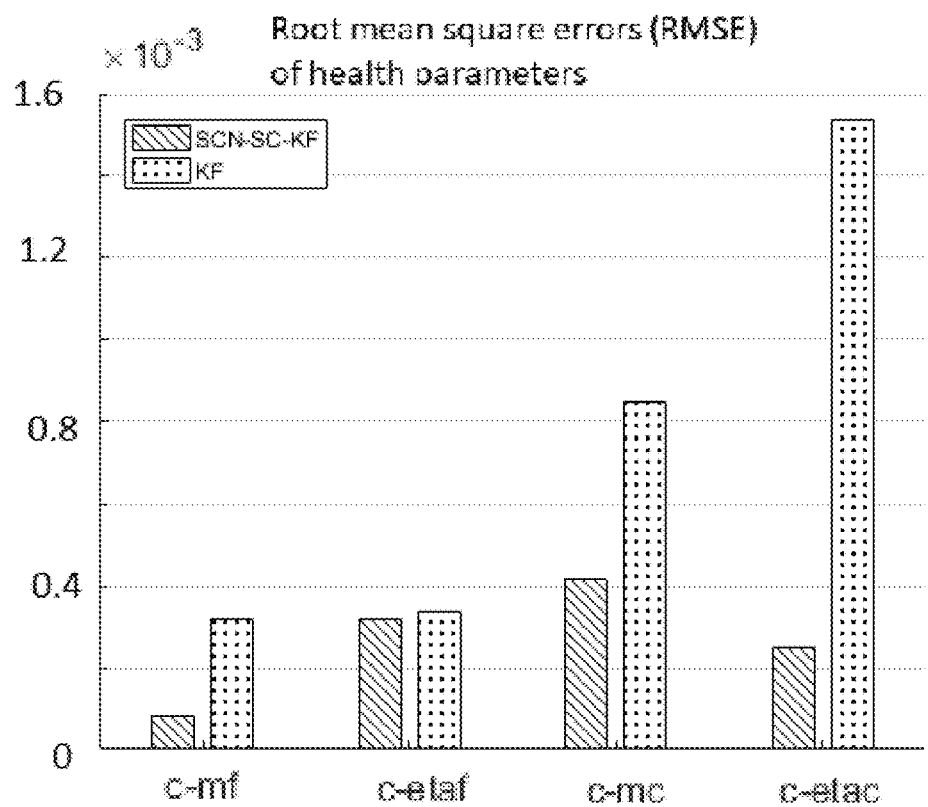

FIG. 9(a), FIG. 9(b) and FIG. 9(c) respectively show estimated results of an original Kalman filter algorithm, a stochastic configuration network based health parameter estimation algorithm with improper structure parameters and a stochastic configuration network based health parameter estimation algorithm optimizing structure parameters by a firefly algorithm on a set of health parameters under the working conditions of H=5000, Ma=0 and Wfm=4500. FIG. 10(a) and FIG. 10(b) respectively show the comparison of estimation accuracies of an original Kalman filter algorithm and a stochastic configuration network based health parameter estimation algorithm with improper structure parameters and the comparison of estimation accuracies of an original Kalman filter algorithm and a stochastic configuration network based health parameter estimation algorithm optimizing structure parameters by a firefly algorithm on a set of health parameters.

The comparison of the simulation results in FIG. 6(a)(b) and FIG. 7 shows that compared with the original Kalman filter estimation, the stochastic configuration network based health parameter estimation algorithm uses the estimated value of the stochastic configuration network on the health parameter as the compensation of the Kalman filter, which can ensure the estimation accuracy of the Kalman filter when the number of engine sensors is less than that of parameters to be estimated. However, the problem that the estimation accuracy on individual health parameters is still poor exists. The estimation accuracy of the algorithm is expressed by the root mean square error sum of the health parameters, and the root mean square error sum sum(RMSE) of the health parameters of the stochastic configuration network based health parameter estimation algorithm is reduced by 69.03% compared with the original Kalman filter algorithm.

The comparison of the simulation results in FIG. 9(a), (b), (c) and FIG. 10(a), (b) shows that under the combination of individual health parameters of individual working conditions, the structure parameters are optimized so that the stochastic configuration network based health parameter estimation algorithm has higher accuracy, better universality and obvious performance advantages and does not have the problem that the estimation accuracy on individual health parameters is poor. The estimation accuracy of the algorithm is expressed by the root mean square error sum of the health parameters, and the root mean square error sum sum(RMSE) of the health parameters of the stochastic configuration network based health parameter estimation algorithm is reduced by 64.82% compared with the original Kalman filter algorithm after the structure parameters are optimized by the firefly algorithm.

In conclusion, the stochastic configuration network based health parameter estimation algorithm proposed by the present invention significantly enhances the estimation accuracy and has obvious performance advantages when the number of engine sensors is less than that of parameters to be estimated.

The invention claimed is:
1. A stochastic configuration network based turbofan engine health parameter estimation method, comprising the following steps:
   step 1: establishing a state space model of a turbofan engine
   step 1.1: establishing an aero-thermodynamics model of the component level of the turbofan engine based on the volume method, which is expressed as:

$$\begin{cases} \dot{x} = f(x, h, u) \\ y_m = g_m(x, h, u) \\ y_u = g_u(x, h, u) \end{cases}$$

wherein $x=[N_l,N_h]^T \in R^2$, $N_l$ is the fan rotary speed, $N_h$ is the compressor rotary speed, and $R^2$ is a two-dimensional real vector; $h=[c\_mf,c\_etaf,c\_mc,c\_etac]^T \in R^2$, c_mf is the fan mass flow, c_etaf is the fan effectiveness, c_mc is the compressor mass flow, and c_etac is the compressor effectiveness; $u=[W_{fm},A_8]^T \in R^2$, $W_{fm}$ is the fuel flow, and $A_8$ is the nozzle area; $y_m=[N_l,N_h,T_{25},T_6,P_6]^T \in R^2$, $N_l$ is the fan rotary speed, $N_h$ is the compressor rotary speed, $T_{25}$ is the compressor inlet total temperature, $T_6$ is the low pressure turbine exit temperature, and $P_6$ is the low pressure turbine exit pressure; and $y_u=[Pit,T_{41c}]^T \in R^2$, Pit is the turbine nozzle pressure ratio, and $T_{41c}$ is the turbine inlet temperature;

step 1.2: at a steady-state point $(x_{ss}, u_{ss}, y_{ss}, h_{ref})$, linearizing the aero-thermodynamics model of the component level of the turbofan engine into a small perturbation state variable model, which is expressed as:

$$\begin{cases} \Delta\dot{x} = A\Delta x + B\Delta u + L\Delta h + v \\ \Delta y_m = C_m\Delta x + D_m\Delta u + M_m\Delta h + w \\ \Delta y_u = C_u\Delta x + D_u\Delta u + M_u\Delta h \end{cases}$$

wherein $\Delta x=x-x_{ss}$, $\Delta u=u-u_{ss}$, $\Delta y=y-y_{ss}$, and $\Delta h=h-h_{ref}$; A, B, L, $C_m$, $D_m$, $M_m$, $C_u$, $D_u$ and $M_u$ are system matrices; v and w are respectively a system noise matrix and a measurement noise matrix, and the covariance matrices thereof are respectively Q and R; and $x_{ss}$, $u_{ss}$ and $y_{ss}$ are respectively the steady states of the state vector x, the input vector u and the output vector y, and $h_{ref}$ is the steady reference of the health parameter vector h;

step 1.3: normalizing the perturbation state variable model to improve the numerical stability step 1.4: taking the health parameter degradation as an augmented state variable, and the state space model of the turbofan engine is expressed as:

$$\begin{cases} \Delta \dot{x}_{aug} = A_{aug}\Delta x_{aug} + B_{aug}\Delta u + v \\ \Delta y_m = C_{aug,m}\Delta x_{aug} + D_{aug,m}\Delta u + w \\ \Delta y_u = C_{aug,u}\Delta x_{aug} + D_{aug,u}\Delta u \end{cases}$$

wherein $\Delta x_{aug} = [\Delta x, \Delta h]^T$, $A_{aug} = [A, L; 0, 0]$, $B_{aug} = [B, 0]^T$, $C_{aug,m} = [C_m, M_m]$, $C_{aug,u} = [C_u, M_u]$, $D_{aug,m} = D_m$, $D_{aug,u} = D_u$, and the subscript "aug" is the augmented state;

step 2: collecting the measurable parameters in the case of gas path performance degradation of the turbofan engine, including the sensor measured value of the fan rotary speed $N_l$, the sensor measured value of the high pressure compressor rotary speed $N_h$, the sensor measured value of the high pressure compressor inlet total temperature $T_{25}$, the sensor measured value of the low pressure turbine exit temperature $T_6$, and the sensor measured value of the low pressure turbine exit pressure $P_6$, as the data set for realizing turbofan engine gas path health parameter estimation as well as the training data and test data for the constructed stochastic configuration network;

step 2.1: adopting the mean imputation method and the 3σ principle for data hygiene, and processing the missing values and outliers;

step 2.2: taking the deviation of the output of the real turbofan engine from the steady output as the input data of the training data, and taking the variations of the health parameters as the target data of the training data;

step 2.3: normalizing the training data, and saving the training data and the data information (maximum value and minimum value);

step 3: designing an improved hybrid Kalman filter according to the state space model of the turbofan engine, and adjusting the corresponding Kalman filter parameters;

step 3.1: setting the input of the improved hybrid Kalman filter to the measurable input deviation $\Delta y_m$ of the turbofan engine containing measurement noise, the state space model of the turbofan engine to the steady state reference model of the improved hybrid Kalman filter, and the output of the improved hybrid Kalman filter to the augmented state variable $x_{aug} = [N_l, N_h, c\_mf, c\_etaf, c\_mc, c\_etac]^T \in R^2$;

step 3.2: expressing the augmented state variable model of the improved hybrid Kalman filter as:

$$\begin{cases} \dot{\hat{x}}_{aug,k} = A_{aug}(\hat{x}_{aug,k} - \hat{x}_{aug,ss,k}) + K_k(y_{m,k} - \hat{y}_{m,k}) \\ \hat{y}_{m,k} = C_{aug,m}(\hat{x}_{aug,k} - \hat{x}_{aug,ss,k}) + \hat{y}_{m,ss,k} \end{cases}$$

wherein $\hat{x}_{aug,k}$ is the estimated augmented state variable of the improved hybrid Kalman filter at the k moment, $\hat{x}_{aug,ss,k}$ the steady augmented state variable at the k moment, $y_{m,k}$ is the measurable output of the turbofan engine at the k moment, $\hat{y}_{m,k}$ is the estimated measurable output of the improved hybrid Kalman filter at the k moment, $\hat{y}_{m,ss,k}$ is the steady measurable output at the k moment, $K_k$ is the Kalman gain matrix at the k moment, $K_k = P_k^- C_{aug,m}^T (C_{aug,m} P_k^- C_{aug,m}^T + R)^{-1}$, $P_k^-$ is the covariance matrix of prior state estimation error at the k moment, $P_k^- = A_{aug} P_{k-1}^+ A_{aug}^T + Q$, $P_k^+$ is the covariance matrix of posterior state estimation error at the k moment, and $P_k^+ = (I - K_k C_{aug,m}) P_k^-$; when k=0, $\hat{x}_{aug,0}^+$ and $P_0^+$ are initialized:

$$\begin{cases} \hat{x}_{aug,0}^+ = E(x_0) \\ P_0^+ = E[(x_0 - \hat{x}_0^+)(x_0 - \hat{x}_0^+)^T] \end{cases}$$

step 4: constructing a stochastic configuration network by using the training data and test data;

step 4.1: taking 70% of the normalized training data obtained in step 2.3 as the training data, and 30% as the test data;

step 4.2: letting the mapping relationship of L−1 hidden nodes added between the measurable parameter X and the health parameter to be estimated of the turbofan engine be expressed as $f_{L-1}(X)$, then:

$$f_{L-1}(X) = \sum_{i=1}^{L-1} \beta_i \cdot g_i(\omega_i^T \cdot X + b_i)$$

wherein L=1, 2, . . . , $f_0=0$, $X=[N_l, N_h, c\_mf, c\_etaf, c\_mc, c\_etac]^T \in R^2$, $\omega_i$ is the input weight of the $i^{th}$ hidden node, $b_i$ is the bias of the $i^{th}$ hidden node, $g_i$ is the output of the $i^{th}$ hidden node, and $\beta_i$ is the output weight of the $i^{th}$ hidden node;

step 4.3: calculating the error $e_{L-1} = f - f_{L-1} = [e_{L-1,1}, \ldots, e_{L-1,4}]$ at this time, wherein f is the actual operation data of the turbofan engine; if the error meets the error threshold given by the training network, ending the training and returning the current network parameters; if the error does not meet the error threshold given by the training network, adding a new hidden node, i.e., randomly generating a new basis function $g_L$, wherein the randomly generated $g_L$ needs to meet the following inequality:

$$<e_{L-1,q}, g_L>^2 \geq b_g^2 \delta_{L,q}, q=1, \ldots, 4$$

wherein $b_g \in R^+$ and meets $0 < \|g\| < b_g$, $\forall g$ belongs to the $L_2$ space tensor, and $e_{L-1,q}$ is the $q^{th}$ component of the error; $\delta_{L,q} = (1 - r - \mu_L) \|e_{L-1,q}\|^2, q=1, \ldots, 4$, wherein $0 < r < 1$, $\mu_L$ meets $\lim_{L \to \infty} \mu_L = 0$ and $\mu_L \leq (1-r)$, $<\cdot,\cdot>$ expresses inner product operation, and $\|\cdot\|$ expresses Euclidean norm operation;

step 4.4: calculating the output weight $\beta_{L,q}$ of the hidden node, as shown in the following formula:

$$\beta_{L,q} = \frac{<e_{L-1,q}, g_L>}{\|g_L\|^2}, q = 1, \ldots, 4$$

step 4.5: calculating the error $e_L$ after adding the L hidden node; if the error meets the error threshold given by the training network, ending the training and returning the current network parameters; if the error does not meet the error threshold given by the training network, returning to step 4.2 to continue to add a hidden node until the error meets the error threshold given by the training network;

step 5: designing a stochastic configuration network based Kalman filter step 5.1: adding a penalty term to the cost function of the renewal process of the Kalman filter algorithm, wherein the penalty term is the quadratic sum of deviations from the current estimated result of the stochastic configuration network, thereby obtaining the cost function as follows:

$$J_k = (y_{m,k} - C_{aug,m}\hat{x}_{aug,k})^T R^{-1}(y_{m,k} - C_{aug,m}\hat{x}_{aug,k}) + (\hat{x}_{aug,k} - x_{SCN,k})^T (\beta R_w)^{-1}(\hat{x}_{aug,k} - x_{SCN,k})$$

wherein $x_{SCN,k}$ is the estimated result of the stochastic configuration network k at the SCN moment; $\beta$ is the scale factor; $R_w$ is the diagonal matrix;

step 5.2: setting the input of the stochastic configuration network based Kalman filter to the measurable input deviation $\Delta y_m$ of the turbofan engine containing measurement noise and the deviation of the engine steady state output; and taking the output of the state space model of the engine directly as the steady state reference model of the stochastic configuration network based Kalman filter, and the output of the stochastic configuration network based Kalman filter as the augmented state variable $x=[N_l,N_h,c\_mf,c\_etaf,c\_mc,c\_etac]^T$, wherein $N_l$ is the fan rotary speed, $N_h$ is the compressor rotary speed, c_mf is the fan mass flow, c_etaf is the fan effectiveness, c_mc is the compressor mass flow, and c_etac is the compressor effectiveness;

step 5.3: on the basis of step 3, normalizing and taking the deviation of the output of the real turbofan engine from the steady output as the input of the stochastic configuration network, and then outputting the variation of the health parameter after inverse normalization;

step 5.4: adding constraints $\Delta c_{mf} \leq 0$, $\Delta c_{etaf} \leq 0$, $\Delta c_{mc} \leq 0$, $\Delta c\_etac \leq 0$ to the output end of the stochastic configuration network;

step 5.5: expressing the augmented state variable model of the stochastic configuration network based Kalman filter as:

$$\begin{cases} \dot{\hat{x}}_{aug,k} = A_{aug}(\hat{x}_{aug,k} - \hat{x}_{aug,ss,k}) + K_k(y_{m,k} - \hat{y}_{m,k}) + \\ \quad K'_k(x_{SCN,k} - A_{aug}(\hat{x}_{aug,k} - \hat{x}_{aug,ss,k})) \\ \hat{y}_{m,k} = C_{aug,m}(\hat{x}_{aug,k} - \hat{x}_{aug,ss,k}) + \hat{y}_{m,ss,k} \end{cases}$$

wherein $K_k$ is the Kalman gain at the k moment:

$$K_k = P'_k C_{aug,m}^T (C_{aug,m} P'_k C_{aug,m}^T + R)^{-1}$$

$K'_k$ is the stochastic configuration network gain at the k moment:

$$K'_k = (I - K_k C_{aug,m}) P'_k (\beta R_w)^{-1}$$

$P'_k$ is the covariance matrix of state estimation error at the k moment:

$$P'_k = P_k^- - P_k^- (P_k^- + \beta R_w)^{-1} P_k^-$$

wherein $P_k^-$ is the covariance matrix of prior state estimation error at the k moment, $P_k^- = A_{aug} P_{k-1}^+ A_{aug}^T + Q$, $P_k^+$ is the covariance matrix of posterior state estimation error at the k moment, and $P_k^+ = (I - K_k C_{aug,m}) P'_k - K'_k (\beta R_w - P'_k) K'_k^T$; when k=0, $\hat{x}_{aug,0}^+$ and $P_0^+$ are initialized:

$$\begin{cases} \hat{x}_{aug,0}^+ = E(x_0) \\ P_0^+ = E[(x_0 - \hat{x}_0^+)(x_0 - \hat{x}_0^+)^T] \end{cases}$$

step 6: optimizing the scale factor $\beta$ of SCN in the stochastic configuration network based Kalman filter and SCN output gains $K_1, K_2$ respectively corresponding to two health parameters with large errors based on the Firefly Algorithm (FA);

step 6.1: determining the firefly population size, and the number of the parameters to be optimized is three, respectively the scale factor $\beta$ corresponding to SCN in the structure, and SCN output gains $K_1, K_2$ respectively corresponding to two health parameters with large errors; letting the firefly population size be n and the dimension of the problem domain be 3, then the firefly population of the parameters to be optimized is expressed by a matrix of n×3; and letting the health parameter estimated value of the output of the stochastic configuration network based Kalman filter be y, the desired output be d, and the cost function J be the root mean square error (RMSE) sum of the health parameters, then defining as follows:

$$J = \sum_{i=1}^{m} \sqrt{\frac{1}{N} \sum_{j=i}^{N} (y_j - d_j)^2}$$

wherein m is the number of the health parameters, N is the number of the sampling points, $y_j$ is the health parameter estimated value of the $j^{th}$ sampling, and $d_j$ is the desired output of the $j^{th}$ sampling;

step 6.2: initializing the algorithm parameters, including the firefly population size n, the step $\alpha$, the maximum attraction $\varphi_0$, the absorption coefficient $\gamma$, the maximum iteration number and the accuracy $\varepsilon$;

step 6.3: randomly initializing the position of each firefly, and expressing the individual position vector of the firefly as $p(t)=(\beta, K_1, K_2)$; calculating the cost function value of each firefly as the maximum luminescence intensity $I_0$ thereof, wherein $I_0$ is the root mean square error sum of the health parameters obtained by simulation of the stochastic configuration network based Kalman filter of the parameters $\beta, K_1, K_2$; and the random initialization range of $\beta$ is 1000 to 100000, the random initialization range of $K_1$ is −2 to −0.5, and the random initialization range of $K_2$ is −2 to −0.5;

step 6.4: calculating the relative intensity I of the firefly, calculating the attraction $\varphi$, and determining the moving direction of the firefly according to the relative intensity; the relative intensity is $I = I_0 e^{-\gamma r_{ij}}$, wherein $\gamma$ is the absorption coefficient, $r_{ij}$ is the distance between the fireflies i and j, and $r_{ij} = \|p_i - p_j\| = \sqrt{\sum_{v=1}^{w}(p_i^v - p_j^v)^2}$; and $p_i^v$ is the $i^{th}$ component of the position vector of the $v^{th}$ firefly w is the number of components of the position vector of the firefly, and the attraction is $\varphi = \varphi_0 e^{-\gamma r_{ij}^2}$, wherein $\varphi_0$ is the maximum attraction;

step 6.5: updating the position of the firefly, and the iteration of position is as follows:

$$p_i(t+1) = p_i(t) + \varphi(p_j(t) - p_i(t)) + \alpha \varepsilon^t$$

wherein $p_i(t)$ and $p_j(t)$ are the spatial positions of two fireflies i, j at the t moment, $\alpha$ is the step, and $\varepsilon$ is the random factor of uniform distribution;

step 6.6: recalculating the maximum luminescence intensity $I_0$ of the firefly according to the updated position;

step 6.7: making a conditional judgment, and if the accuracy or the maximum number of searches is met, stopping iteration and returning the current parameter; otherwise, performing the next iteration, and returning to step 6.4 to continue search;

step 7: estimating the health parameters of the gas path components in the case of gas path performance degradation of the turbofan engine based on the acquired optimum parameters.

\* \* \* \* \*